United States Patent
Yerfule et al.

(10) Patent No.: US 12,306,800 B2
(45) Date of Patent: May 20, 2025

(54) MULTI-ROOT CONTENT MANAGEMENT SYSTEM

(71) Applicant: Dropbox, Inc., San Francisco, CA (US)

(72) Inventors: Sourabh Yerfule, Sunnyvale, CA (US); Jordi Paris Ferrer, San Francisco, CA (US); Kelson Reiss, San Francisco, CA (US); Parker Timmerman, New York, NY (US); Sabrina Weschler, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/087,721

(22) Filed: Dec. 22, 2022

(65) Prior Publication Data

US 2024/0211444 A1    Jun. 27, 2024

(51) Int. Cl.
| | |
|---|---|
| *G06F 16/178* | (2019.01) |
| *G06F 16/13* | (2019.01) |
| *H04L 67/1095* | (2022.01) |

(52) U.S. Cl.
CPC .......... *G06F 16/178* (2019.01); *G06F 16/13* (2019.01); *H04L 67/1095* (2013.01)

(58) Field of Classification Search
CPC ..... G06F 16/178; G06F 16/13; H04L 67/1095
See application file for complete search history.

(56) References Cited

U.S. PATENT DOCUMENTS

| | | |
|---|---|---|
| 9,405,904 B1 | 8/2016 | Fang et al. |
| 10,440,106 B2 | 10/2019 | Murstein et al. |
| 10,896,154 B2 | 1/2021 | Kaplan et al. |

(Continued)

FOREIGN PATENT DOCUMENTS

| | | |
|---|---|---|
| AU | 2006284414 B2 | 2/2011 |
| CN | 105978981 B | 9/2019 |

(Continued)

OTHER PUBLICATIONS

Zhao M., et al., "H2Cloud: Maintaining the Whole Filesystem in an Object Storage Cloud," Proceedings of the 47th International Conference on Parallel Processing, Article No. 68, Aug. 2018, 10 pages.

(Continued)

*Primary Examiner* — Yuk Ting Choi
(74) *Attorney, Agent, or Firm* — Polsinelli PC

(57) ABSTRACT

The present technology is directed to providing a multi-root architecture for managing devices associated with their own root namespaces. The system can include backing up multiple computing devices to a single user account such that the content items from each computing device are stored in their own respective root namespace at the user account. With each user account having multiple root namespaces, the system can identify which root namespace is receiving changes, identify which changes are necessary to synchronize the system, and then communicate those changes to the content management system. This process is facilitated by running a synchronization engine for each root namespace, thereby controlling synchronization for each root namespace. Each synchronization engine is able to retain its own parameters of operation, which provides the ability to tailor synchronization modes on each synchronization engine.

19 Claims, 14 Drawing Sheets

(56) References Cited

U.S. PATENT DOCUMENTS

| | | | |
|---|---|---|---|
| 10,951,702 B2 | 3/2021 | Houston | |
| 10,963,430 B2 | 3/2021 | Von Muhlen et al. | |
| 11,188,564 B1 | 11/2021 | Paterra | |
| 11,265,322 B2 | 3/2022 | Shen et al. | |
| 11,310,213 B2 | 4/2022 | Regula et al. | |
| 11,470,152 B2 | 10/2022 | Littlefield et al. | |
| 11,475,041 B2 | 10/2022 | Lai | |
| 2003/0225753 A1* | 12/2003 | Balassanian | G06F 16/33 707/999.003 |
| 2009/0228531 A1* | 9/2009 | Baumann | G06F 11/1451 707/999.204 |
| 2014/0330787 A1* | 11/2014 | Modukuri | G06F 11/2056 707/659 |
| 2014/0372607 A1* | 12/2014 | Gladwin | G06F 3/067 709/224 |
| 2016/0292443 A1* | 10/2016 | von Muhlen | H04L 63/104 707/654 |
| 2017/0193201 A1 | 7/2017 | Eccleston et al. | |
| 2018/0165471 A1* | 6/2018 | von Muhlen | H04L 63/104 707/654 |
| 2018/0189311 A1* | 7/2018 | Newhouse | G06F 21/52 707/737 |
| 2018/0246946 A1* | 8/2018 | Sadhwani | G06F 16/273 707/737 |
| 2018/0364932 A1* | 12/2018 | Aron | G06F 11/20 707/654 |
| 2019/0124169 A1* | 4/2019 | Sundin | H04L 67/535 707/654 |
| 2019/0205440 A1 | 7/2019 | Kleinpeter et al. | |
| 2020/0236194 A1* | 7/2020 | Lim | H04L 67/08 707/654 |
| 2020/0272603 A1 | 8/2020 | Matters et al. | |
| 2021/0200720 A1* | 7/2021 | Ramabhadran | H04L 67/1095 707/654 |
| 2021/0232461 A1* | 7/2021 | Calmon | G06F 11/1464 707/654 |
| 2022/0188273 A1 | 6/2022 | Koorapati et al. | |
| 2022/0197860 A1* | 6/2022 | Hickey | G06F 16/182 707/654 |
| 2023/0185674 A1* | 6/2023 | Manley | G06N 20/00 707/654 |

FOREIGN PATENT DOCUMENTS

| | | | |
|---|---|---|---|
| EP | 1973049 A2 * | 9/2008 | G06F 16/182 |
| EP | 3722965 A1 | 10/2020 | |
| WO | 2007024380 A2 | 3/2007 | |

OTHER PUBLICATIONS

International Search Report and Written Opinion for Application No. PCT/US2023/079606 mailed on Feb. 1, 2024, 13 pages.

Non-Final Office Action from U.S. Appl. No. 18/087,723, mailed Mar. 15, 2024, 17 pages.

Final Office Action from U.S. Appl. No. 18/087,723 mailed Sep. 6, 2024, 20 pages.

Non-Final Office Action from U.S. Appl. No. 18/087,730, mailed Sep. 5, 2024, 24 pages.

Non-Final Office Action from U.S. Appl. No. 18/087,737 mailed Jul. 18, 2024, 17 pages.

Notice of Allowance for U.S. Appl. No. 18/087,737 mailed on Dec. 6, 2024, 8 pages.

Final Office Action from U.S. Appl. No. 18/087,730 mailed Feb. 19, 2025, 28 pages.

* cited by examiner

MULTI-ROOT CONTENT MANAGEMENT SYSTEM

TECHNICAL FIELD

The present technology relates to a multi-root synchronization system and specifically to using a multi-root system of unmounted namespaces within a content management system.

BACKGROUND

Content management systems allow users to access and manage content items across multiple devices using a network. Some content management systems may allow users to share content items and provide additional features that aid users in collaborating using the content items. Content management systems generally store content items on servers and allow users access to the content items over a network. Some content management systems also allow for local copies to be stored on a client device to provide users with faster access to content items in a more natural interface (e.g., a native application or within the file system of the client device). Additionally, local storage allows the user to access the content items when the user is offline. Content management systems attempt to synchronize copies of a content item across several client devices and servers so that each copy is identical. However, synchronization of content items is difficult and is associated with numerous technical obstacles. Furthermore, users have also long used backup mechanisms in addition to content management systems. Synchronizing these backup mechanisms is an additional complexity within the content management system.

DETAILED DESCRIPTION

Figure 1:
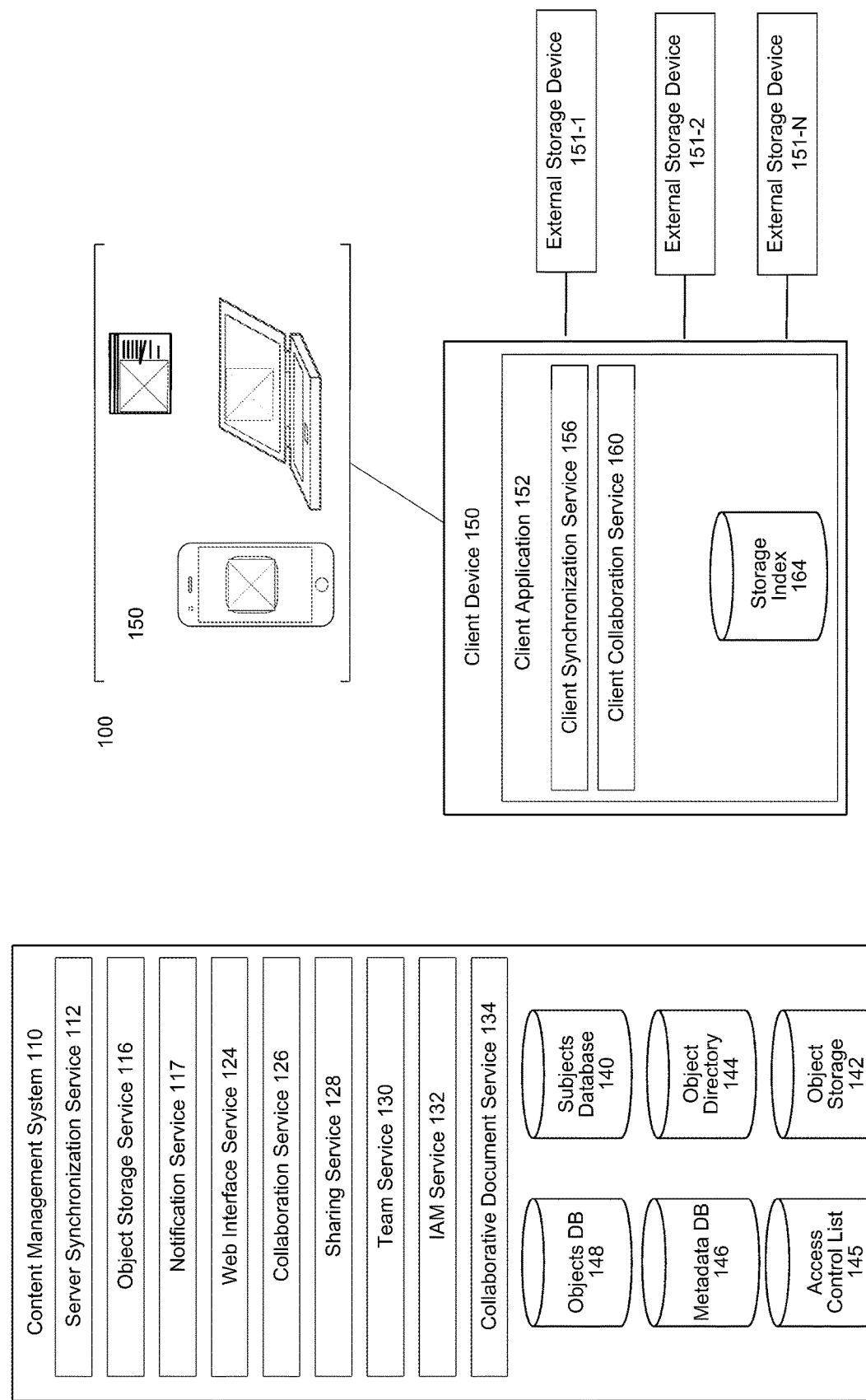
FIG. 1 illustrates an example of a content management system and client devices in accordance with some aspects of the present technology.

As cloud services that provide access to digital objects for modification by an accessing device have become popular, a growing demand has appeared for customizing the synchronization process based on user behavior, user devices, user and/or device location, and system capabilities. While cloud-based storage or synchronization services perform core functions, including backup service, many users find these services unsatisfactory for all devices that join the synchronization system. At the same time, users have become comfortable with these cloud-based storage or synchronization services. Users want these services to provide much more granular control and customization to the synchronization process.

Cloud-based storage or synchronization services often maintain a copy of all of a user's digital objects (or at least objects to which the user has given the service access) and thus provide a backup copy of those objects. Many such services also offer features that allow a user to find a copy of an object that existed at a past date, which makes it so objects that have been modified over time can have iterative versions backed up. However, some cloud-based storage or synchronization services allow objects to be shared and modified by multiple different users. Such services also allow many different devices to modify digital objects. Also, when the devices are external storage devices, the system may need to recognize the external storage devices being accessed from multiple client devices. With current synchronization systems, access and control of the external storage devices are difficult to implement within the standard synchronization processes.

The infrastructure of current cloud-based storage or synchronization services is highly developed and optimized for copying objects from one location to another. Accordingly, it is desirable to use the trusted infrastructure of cloud-based storage or synchronization services to provide services to backup devices. Still, some modifications need to be made to allow the backup service to function as users desire and provide more control over how the synchronization process interacts with the various client devices and storage devices. Accordingly, the present technology is directed to modifying the existing infrastructure of cloud-based storage or synchronization services to provide increased control over the synchronization of individual devices within the synchronization system.

Additionally, service providers providing cloud-based storage or synchronization services are well equipped to provide a backup service that meets users' needs, but certain problems need to be solved. For example, the under some circumstances, a synchronization service and a backup service need different behaviors based on the respective type of devices and the services provided to those devices. As noted above, there are challenges related to utilizing the synchronization infrastructure to provide appropriately tailored interactions between the synchronization infrastructure, various client devices, and external storage devices. Additionally, when the same service provider is providing synchronization to both client devices and external storage devices, there are challenges related to providing separate and controllable access to each device and providing a synchronization process that works for all devices associated with a user account at a content management system. For example, a user will expect to be able to make changes to objects in the synchronization service but not objects in the backup service, and if there are multiple external drives, a user will expect to be able to control how each device is synchronized. The present technology is directed to solving such problems.

The present technology is directed to providing a synchronization system utilizing an independent multi-root synchronization architecture. The synchronization system can provide individualized synchronization behavior while supporting multiple types of user devices. The multi-root architecture associates a user account with multiple root namespaces and multiple instances of a synchronization engine. By using an instance of the synchronization engine for each root namespace, the system can support individualized synchronization behavior and processes for each user device associated with the user account. The multi-root architecture allows each root namespace to run an independent instance of the synchronization engine for its individualized synchronization processes. Independent instances of the synchronization engine are an improvement over previous content management systems that create a queue for all synchronization processes in the single root namespace and use a single synchronization engine to synchronize all received changes.

Additionally, the present technology differentiates between client devices and external storage devices, supporting a tailored synchronization process for each device. By utilizing a multi-root architecture, the system can assign an instance of the synchronization engine to each of the root namespaces and allow each instance of the synchronization engine to operate independently of any other root namespace associated with the user account and/or content management system. This multi-root architecture allows a single user account to support multiple root namespaces with independent synchronization processes. Independent synchronization processes will enable the system to easily accept and synchronize external storage devices because the system can run one independent synchronization process for the client device and another independent synchronization process for the external storage device. By having multiple independent processes, one for each device and/or namespace, synchronization is not impacted by the most limited piece of hardware or the accessibility of a specific device, thereby improving the speed, reliability, and availability of the synchronization process.

Accordingly, the present technology provides a variety of benefits. For example, the present technology provides the benefit of a multi-root system where each root namespace associated with a user account can be synchronized individually based on having its own instance of the synchronization engine. For example, every root namespace of the content management system can have its own instance of the synchronization engine, its own file system, and its own cache directory that allows individualized control of the synchronization for that root namespace. A root namespace refers to the root folder at the content management system, which can be the folder created when a user signs up for an account at the content management system or can be the folder that is created when a user initiates backup of a new device. Typically, all files or subfolders subsequently added to the root folder are said to exist in the root namespace, and to synchronize properly, every file and folder needs to be associated with a namespace. The root namespace is only visible to the user who signed up for the account. The multi-root system can base synchronization on any number of different parameters, including at least time, permissions, location, content synchronized, and/or user-defined settings because each root namespace has its own instance of the synchronization engine that allows for customization of the synchronization process.

Previously, content management systems operated using a single root system, where the root namespace is created when the user signs up with the content management system. The content management system can define or record a content path for a content item wherein the "root" node of a directory structure can be a namespace for each account. The root node has no parent node, and all subsequent files or folders are stored within the root namespace. In a single root system, when additional namespaces are desired, e.g., shared folders are added to the user account, the additional namespaces are nested in the directory structure under the root namespace. Shared folders can be assigned their own namespace within the content management system, but that namespace is stored within the root namespace for that user account. While some shared collections are actually root nodes for the shared collection, they are located subordinate to the root namespace in the directory structure for the user account and can appear as a folder within a directory structure.

A single root namespace system has a single synchronization engine that provides the synchronization for all files within the root namespace. The single synchronization engine has a single schedule and treats all objects under the root namespace similarly. Under this single root namespace system, it is not possible to have multiple synchronization engines that operate on different files and different locations within the single root namespace system. A single root namespace system can lead to issues of scheduling synchronization activities, being unable to support multiple modes of synchronization or different synchronization algorithms, and being unable to separately support external hard drives. A single root system also runs its own lifecycle with a single thread and single network stack for that synchronization engine. The disadvantages of the single root namespace are born from the system assigning all the resources to a single synchronization engine that synchronizes the single root namespace. To provide more granular control of the synchronization process, the system needs to share resources between multiple instances of the synchronization engine. By implementing multiple instances of the synchronization engine that share computation and network resources, but can run independently, allows the content management system to operate multiple root namespaces for a single user account.

One feature of the multi-root architecture is the ability of the client synchronization service to use a thread pool to distribute processing to the instances of the synchronization engine. The synchronization service will also have access to the network stack that can distribute network resources to each instance of a synchronization engine. By setting up the multi-root architecture to share a thread pool and network stack, the synchronization service can operate multiple instances of a synchronization engine, one for each namespace. With the shared resources available to run multiple instances of the synchronization engine, the synchronization service can support multiple root namespaces for a single user account. The namespaces can be assigned so that instead of having a single root namespace from when a user signs up for the service, the user can have multiple root namespaces for each new device added to the synchronization service.

The multi-root architecture has the additional advantages of keeping the root namespace associated with the user account but also being able to add additional namespaces associated with the user account, which provides optionality and control to individual devices. For example, if a user adds an external hard drive to their user account in a system with multi-root architecture, the external hard drive can have its own independent root namespace for backup purposes that runs separately from the account namespace on a user's primary computer. The multi-root architecture provides the ability for the user to synchronize the external hard drive periodically and independently of the user's primary computer. Despite the schedule of the external hard drive, the user's primary computer can synchronize according to its normal synchronization schedule. The backup root namespace and account root namespace can share resources when needed, provide more resources to one device instead of the other, or can completely pause synchronization on one device in favor of exclusively synchronizing a priority device. A multi-root architecture works seamlessly with multiple devices, all with independent control and synchronization settings, thereby avoiding the one size fits all solution required by single-root namespace systems.

Another benefit of the present technology is the ability to provide synchronization to external drives that can be accessed at multiple locations. For example, using a multi-root architecture, with each root namespace having its own synchronization process, the system can support an external drive starting a synchronization process at one computer, being disconnected, and then continuing the synchronization process at a different computer. In single-root namespace systems with a single synchronization process, the synchronization system would not be able to independently track a single external device in addition to the user's primary account, much less synchronize an external device where the synchronization process was interrupted. The single-root systems would fail because, without a specific root namespace for the external device, the system is unable to collect the data needed to track the synchronization state of an external drive that would allow the system to resume synchronization. With the current multi-root system, this problem is solved by having the state of the synchronization data stored with the instance of the synchronization engine at the external device, which allows the synchronization system to resume synchronization processes from where they are interrupted.

Another benefit of the present technology is to provide individualized synchronization processes for each root namespace of the multi-root system. When there is a single root namespace, the synchronization process will operate on that single root namespace even if there are multiple devices represented within that single root namespace. By using a multi-root architecture and running the synchronization process on each of the root namespaces, synchronization can be individualized for each root namespace. This improvement allows for a user or system to optimize resources by using the resources strategically instead of having to run the synchronization process on every file system change regardless of where the change originated. The multi-root architecture also allows for schedules to be set based on external factors associated with the user account or the client device. For example, an individualized schedule for synchronization can be impacted by location, time, device, and permissions, amongst other factors of each root namespace.

Another benefit of the present technology is to provide the opportunity to individualize the mode of synchronization depending on the device being backed up. This improvement is possible because each root namespace has its own instance of the synchronization engine, so if, for example, an external drive only supports one-way synchronization (e.g., synchronizing in one direction), it can still be backed up in a multi-root architecture, but not in a single-root system. During one-way synchronization, the external drive can provide changes to a remote location for backup, but does not allow a remote location to make changes at the external drive. During one-way synchronization the synchronization engine for that root namespace can be tailored to operate in a one-way synchronization mode without impacting synchronization for any other root namespace. This differs from the typical client device (e.g., a laptop computer, mobile device, etc.), where the device supports both read and write capabilities. In a synchronization system with only a single root namespace and single synchronization engine, the synchronization processes are hindered by the least capable device, i.e., a device that only supports one-way synchronization. By supporting individualized synchronization processes, this improvement makes it possible to use the best synchronization process for each device's capabilities instead of a single synchronization mode, regardless of what devices require synchronization.

Another benefit of the present technology is to provide the ability to synchronize from the cloud changes to an external device. This improvement is provided by the multi-root architecture, where the individualized root namespaces allow for the communication of changes from the cloud to the external device. When a system uses a single root namespace structure for synchronization, the system is not able to independently differentiate between the synchronization state of the external drive and the synchronization state of a client device. Without this differentiation, synchronization from the cloud to the external device, while excluding the client device, is impractical, if not impossible.

Another benefit of the present technology is to provide the ability to control the synchronization of files within each individual root namespace of any root namespaces of the multi-root architecture. An improvement that comes from using a multi-root architecture is the individualized synchronization of files or folders using an indication, e.g., an allow file or a ignore file, of which files or folders the content management system is allowed to synchronize. By running the synchronization process independently on an instance of the synchronization engine on each root namespace of the multi-root system, the individual synchronization process is tailored to synchronize allowed files and skips synchronization for files designated as files to be ignored.

These are just some of the benefits provided by the present technology and should not be considered a complete list of all benefits.

In some embodiments, the disclosed technology is deployed in the context of a content management system having object synchronization capabilities, object backup capabilities, and collaboration features, among others. An example configuration of system 100 is shown in FIG. 1, which depicts content management system 110 interacting with a client device 150.

Accounts

Content management system 110 can store objects in association with accounts, as well as perform a variety of object management tasks, such as retrieve, modify, browse, and/or share the object(s). Furthermore, the content management system 110 can enable an account to access object(s) from multiple client devices.

Content management system 110 supports a plurality of accounts. A subject (user, group, team, company, etc.) can create an account with the content management system 110, and account details can be stored in the subject database 140. Subject database 140 can identify a registered subject by a subject ID and store profile information for registered subjects in association with the subject ID. In some cases, profile information for registered subjects includes a subject name and/or email address. Subject database 140 can include account management information, such as account type (e.g., various tiers of free or paid accounts), storage space allocated, storage space used, client device 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 140 need not store complete information associated with an account for a subject. Some portion of information associated with an account for a subject can also be stored in another database of the content management system 110, such as metadata database 146, or in a database external to the content management system 110.

Subject database 140 can store groups of accounts associated with a subject. Groups can have permissions based on group permissions statements and/or access control lists, and members of the groups can inherit the permissions. For example, a marketing group can have access to one set of objects, while an engineering group can have access to another set of objects. An administrator group can modify groups, modify subject accounts, etc. Groups are also subjects identified by subject ID.

In some embodiments, subject database 140 can be broken into a plurality of tables, indexes, and other data structures.

Object Storage

A feature of content management system 110 is the storage of objects, which can be stored in object storage database 142. An object generally is any entity that can be recorded in a file system. Objects can be any object, including digital data such as documents, collaboration objects, text files, audio files, image files, video files, webpages, executable files, binary files, directories, folders, zip files, playlists, albums, etc.

In some embodiments, objects can be grouped into a collection, which can refer to a folder including a plurality of objects or a plurality of objects that are related or grouped by a common attribute.

In some embodiments, object storage database 142 is combined with other types of storage or databases to handle specific functions. Object storage database 142 can store objects, while metadata regarding the objects can be stored in metadata database 146. Likewise, data regarding where an object is stored in the object storage database 142 can be stored in content directory 144. Additionally, data regarding changes, access, etc., can be stored in objects database 148. Objects database 148 can also include a subject account identifier that identifies the subject IDs that have access to the object.

In some embodiments, objects database 148 can be broken into a plurality of tables, indexes, and other data structures.

Each of the various storages and/or databases, such as object storage database 142, content directory 144, objects database 148, and metadata database 146, can be comprised of more than one such storage or database and can be distributed over many devices and locations. Other configurations are also possible. For example, data from object storage database 142, content directory 144, objects database 148, and/or metadata database 146 may be combined into one or more object storages or databases or further segmented into additional object storages or databases. Thus, the content management system 110 may include more or less storages and/or databases than shown in FIG. 1.

In some embodiments, object storage database 142 is associated with at least one object storage service 116, which includes software or other processor-executable instructions for managing the storage of objects, including, but not limited to, receiving objects for storage, preparing objects for storage, selecting a storage location for the object, retrieving objects from storage, etc. In some embodiments, object storage service 116 can divide an object into smaller chunks for storage at the object storage database 142. The location of each chunk making up an object can be recorded in content directory 144. Content directory 144 can include a content entry for each object stored in object storage database 142. The content entry can be associated with an object ID, which identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object but will output a different hash for a different object. Using this methodology, object storage service 116 can output a unique hash for each different version of an object.

Object storage service 116 can also designate or record a content path for an object in the objects database 148. The content path can include the name of the object and/or folder hierarchy associated with the object. For example, the content path can include a folder or path of folders in which the object is stored in a local file system on a client device. In some embodiments, an object database might only store a direct ancestor or direct child of any object, which allows a full path for an object to be derived.

While objects are stored in object storage database 142 in blocks and may not be stored under a tree-like directory structure, such a directory structure is a comfortable navigation structure for subjects. Object storage service 116 can define or record a content path for an object wherein the "root" node of a directory structure can be any directory with specific access privileges assigned to it, as opposed to a directory that inherits access privileges from another directory. While the directory structure in which an account views objects does not correlate to storage locations at content management system 110, the directory structure can correlate to storage locations on client device 150, depending on the file system used by client device 150.

As addressed above, a content entry in content directory 144 can also include the location of each chunk making up an object. More specifically, the content entry can include content pointers that identify the location in the object storage database 142 of the chunks that make up the object.

Object storage service 116 can decrease the amount of storage space required by identifying duplicate objects or duplicate blocks that make up an object or versions of an object. Instead of storing multiple copies, object storage database 142 can store a single copy of the object or block of the object, and content directory 144 can include a pointer or other mechanism to link the duplicates to the single copy.

Object storage service 116 can also store metadata describing objects, object types, folders, file paths, and/or the relationship of objects to various accounts, collections, or groups in metadata database 146, in association with the object ID of the object.

Object storage service 116 can also store a log of data regarding changes, access, etc., in objects database 148. Objects database 148 can include the object ID of the object and can optionally include a description of the change or access action along with a time stamp or version number and any other relevant data. Objects database 148 can also include pointers to blocks affected by the change or object access. Objects storage service can provide the ability to undo operations by using an object version control that tracks changes to objects, different versions of objects (including diverging version trees), and a change history that can be acquired from the objects database 148.

Object Synchronization

Another feature of content management system 110 is the synchronization of objects with at least one client device 150. The client device(s) can take different forms and have different capabilities. For example, client device 150-1 is a computing device having a local file system accessible by multiple applications resident thereon. Client device 150-2 is a computing device wherein objects are only accessible to a specific application or by permission given by the specific application, and the objects are typically stored either in an application-specific space or in the cloud. Client device 150-N is any client device accessing content management system 110 via a web browser and accessing objects via a web interface. While example client devices 150-1, 150-2, and 150-N are depicted in form factors such as a laptop, mobile device, external storage device, or web browser, it should be understood that the descriptions thereof are not limited to devices of these example form factors. For example, a mobile device such as client device 150-2 might have a local file system accessible by multiple applications resident thereon, or client device 150-2 might access content management system 110 via a web browser. As such, the form factor should not be considered limiting when considering client 150's capabilities. One or more functions described herein with respect to the client device 150 may or may not be available on every client device depending on the specific capabilities of the device—the file access model being one such capability.

In some embodiments, client device 150 can be communicatively connected to an external storage device 151. While external storage device 151 is depicted in a form factor of a portable storage device, it should be understood that the descriptions thereof are not limited to devices of this example form factor. For example, a desktop computer, laptop computer, home server, cloud-based server, or mobile device can all operate as external storage devices. As such, the form factor should not be considered limiting when considering external storage device 151's capabilities. One or more functions described herein with respect to the external storage device 151 may or may not be available on every external storage device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on the client device 150. Client application 152 can include a client synchronization service 156.

Client synchronization service 156 can be in communication with server synchronization service 112 to synchronize changes to objects between the client device 150 and content management system 110.

Client device 150 can synchronize content with the content management system 110 via client synchronization service 156. The synchronization can be platform agnostic. That is, content can be synchronized across multiple client devices of varying types, capabilities, operating systems, etc. Client synchronization service 156 can synchronize any changes (new, deleted, modified, copied, or moved objects) to objects in a designated directory of a file system of client device 150 that is monitored by client synchronization service 156.

In some embodiments, client synchronization service 156 is a bi-directional synchronization service whereby objects can be synchronized from client device 150 to content management system 110 and vice versa. In embodiments wherein synchronization is from client device 150 to content management system 110, a subject can manipulate objects directly from the file system of client device 150, while client synchronization service 156 can monitor a designated directory on the client device 150 for changes to files within the monitored folders.

When client synchronization service 156 detects a write, move, copy, or delete of content in a directory that it monitors, client synchronization service 156 can synchronize the changes to object storage service 116. In some embodiments, client synchronization service 156 can perform some functions of object storage service 116, including functions addressed above, such as dividing the object into blocks, hashing the object to generate a unique identifier, etc. Client synchronization service 156 can index content within client storage index 164 and save the result in client storage index 164. Indexing can include storing paths plus the object identifier and a unique client identifier for each object. In some embodiments, client synchronization service 156 learns the object identifier from server synchronization service 112 and learns the unique client identifier from the operating system of client device 150.

Client synchronization service 156 can use client storage index 164 to facilitate the synchronization of at least a portion of the objects within client storage with objects associated with a subject account on content management system 110. For example, client synchronization service 156 can compare client storage index 164 with the content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update the objects database 148, metadata database 146, content directory 144, object storage database 142, subject database 140, etc., as appropriate.

When synchronizing from the content management system 110 to client device 150, data regarding a mount, modification, addition, deletion, or move of an object recorded in the objects database 148 can trigger a notification to be sent to the client device 150 using notification service 117. When client device 150 is informed of the change, client device 150 can make a request for changes listed in objects database 148 since the last synchronization point known to the client device. When client device 150 determines that it is out of synchronization with the content management system 110, client synchronization service 156 requests object blocks, including the changes, and updates its local copy of the changed objects.

In some embodiments, client storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to the content management system 110 when a network connection is available. Similarly, a subject can manually start, stop, pause, or resume synchronization with the content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remaining portion of the objects. For example, client synchronization service 156 can store a placeholder object that has the same filename, path, extension, and metadata, as its respective complete object on content management system 110 but lacks the data of the complete object. The placeholder object can be a few bytes or less in size, while the respective complete object might be significantly larger. After client device 150 attempts to access the object, client synchronization service 156 can retrieve the data of the object from the content management system 110 and provide the complete object to the client device 150. This approach can provide significant space and bandwidth savings while still providing full access to a subject's objects on the content management system 110.

In some embodiments, client synchronization service 156 can be utilized to provide a backup service by monitoring a directory selected for backup and providing unidirectional synchronization from the client device to the content management system. In such embodiments, directories indicated for backup can be represented by an anchor object that includes attributes that restrict it to uni-directional synchronization.

In some embodiments, multiple instances of client synchronization service 156 can execute simultaneously. Each instance of client synchronization service 156 can be used to monitor a different directory.

Collaboration Features

Another feature of content management system 110 is to facilitate collaboration between subjects. Collaboration features include object sharing, commenting on objects, co-working on objects, instant messaging, providing presence, and seen state information regarding objects, etc.

Sharing

Content management system 110 can manage sharing objects via sharing service 128. Sharing an object by providing a link to the object can include making the object accessible from any computing device in network communication with the content management system 110. However, in some embodiments, a link can be associated with access restrictions enforced by the content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform-agnostic manner. That is, the content can be shared across multiple client devices, e.g., client device 150, of varying types, capabilities, operating systems, etc. The content can also be shared across varying types of subject accounts.

To share an object within the content management system 110, sharing service 128 can add a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in the objects database 148. For example, in some embodiments, subject identifiers associated with a single content item can specify different permissions for respective subject identifiers with respect to the associated object.

In some embodiments, content management system 110 can include an access control list 145, which includes a description of complete access rights pertaining to a respective object. An access control list for any respective object in the content management system can be derived from the objects database 148. In some embodiments, it is not desirable to maintain a persistent access control list 145 for a respective object, as an access control list 145 for a respective object can be derived when needed.

To share objects outside of content management system 110, sharing service 128 can generate a custom network address, such as a uniform resource locator (URL), which allows any web browser to access the object or collection in the content management system 110 without any authentication. To accomplish this, sharing service 128 can include content identification data in the generated URL, which can later be used to properly identify and return the requested object. For example, sharing service 128 can include the account identifier and the content path or an object identifying code in the generated URL. Upon selection of the URL, the content identification data included in the URL can be transmitted to the content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from a specified domain, i.e., from within a corporate network domain or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject, and the contributing subject can upload an object to the first subject's subject account using the URL.

Team Service

In some embodiments, the content management system 110 includes team service 130. Team service 130 can provide functionality for creating and managing defined teams of subject accounts. Teams can be created for a company, with sub-teams (e.g., business units, project teams, etc.), and subject accounts assigned to teams and sub-teams, or teams can be created for any defined group of subject accounts. Team service 130 can provide a common shared space for the team, private subject account folders, and access to limited shared folders. Teams service can also provide a management interface for an administrator to manage collections and objects within a team and can manage subject accounts that are associated with the team. Teams, sub-teams, and subject accounts are all given a subject identifier in subject database 140, and the membership to teams by subject accounts is also recorded in subject database 140.

IAM (Identity and Access Management) Service

In some embodiments, the content management system 110 includes IAM service 132. IAM service 132 ensures that a subject account attempting to access an object has appropriate rights to access the object. IAM service 132 can receive a token from client application 152 that follows a request to access a namespace and can return the capabilities permitted to the subject account. For subject accounts with multiple levels of access (e.g., a subject account with subject rights and administrator rights), IAM service 132 can also require explicit privilege escalation to avoid unintentional actions by administrators.

Presence and Seen State

In some embodiments, a content management system can provide information about how subjects with which an object is shared are interacting or have interacted with the object. In some embodiments, content management system 110 can report that a subject with which an object is shared is currently viewing the object. For example, client collaboration service 160 can notify notification service 117 when client device 150 is accessing the object. Notification service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in the metadata database 146.

Collaboration service 126 can originate and transmit notifications for subjects. For example, a subject can mention another subject in a comment, and collaboration service 126 can send a notification to that subject that he has been mentioned in the comment. Various other object events can trigger notifications, including deleting an object, sharing an object, etc.

Collaboration service 126 can provide a messaging platform whereby subjects can send and receive instant messages, voice calls, emails, etc.

Collaboration Objects

In some embodiments, content management service can also include collaborative document service 134, which can provide an interactive object collaboration platform whereby subjects can simultaneously create collaboration objects, comment in the collaboration objects, and manage tasks within the collaboration objects. Collaboration objects can be files that subjects can create and edit using a collaboration object editor and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments, this can be managed by requiring two subjects to access an object through a web interface, and there, they can work on the same copy of the object at the same time.

Collaboration Companion Interface

In some embodiments, client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by client application 152, the native application may not provide any native way to display the above-addressed collaboration data. In such embodiments, client collaboration service 160 can detect that a subject has opened an object and can provide an overlay with additional information for the object, such as collaboration data. For example, the additional information can include comments for the object, the status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage database 142 via an API on behalf of a subject. For example, a software package, such as an application running on client device 150, can programmatically make API calls directly to the content management system 110 when a subject provides authentication credentials to read, write, create, delete, share, or otherwise manipulate content.

A subject can view or manipulate content stored in a subject account via a web interface generated and served by web interface service 124. For example, the subject can navigate in a web browser to a web address provided by the content management system 110. Changes or updates to content in the object storage database 142 made through the web interface, such as uploading a new version of an object, can be propagated back to other client devices associated with the subject's account. For example, multiple client devices, each with its own client software, can be associated with a single account, and objects in the account can be synchronized between each of the multiple client devices.

Client device 150 can connect to content management system 110 on behalf of a subject. A subject can directly interact with client device 150, for example, when the client device 150 is a desktop or laptop computer, phone, television, internet-of-things device, etc. Alternatively or additionally, client device 150 can act on behalf of the subject without the subject having physical access to client device 150, for example, when client device 150 is a server.

Some features of client device 150 are enabled by an application installed on client device 150. In some embodiments, the application can include a content management system-specific component. For example, the content management system-specific component can be a stand-alone client application 152, one or more application plug-ins, and/or a browser extension. However, the subject can also interact with the content management system 110 via a third-party application, such as a web browser, that resides on client device 150 and is configured to communicate with the content management system 110. In various implementations, the client application 152 can present a subject interface (UI) for a subject to interact with the content management system 110. For example, the subject can interact with the content management system 110 via a file system explorer integrated with the file system or via a webpage displayed using a web browser application.

In some embodiments, client application 152 can be configured to manage and synchronize content for more than one account of the content management system 110. In such embodiments, client application 152 can remain logged into multiple accounts and provide normal services for the multiple accounts. In some embodiments, each account can appear as a folder in a file system, and all objects within that folder can be synchronized with the content management system 110. In some embodiments, client application 152 can include a selector to choose one of the multiple accounts to be the primary account or default account.

Third-Party Services

In some embodiments, content management system 110 can include functionality to interface with one or more third-party services such as workspace services, email services, task services, etc. In such embodiments, content management system 110 can be provided with login credentials for a subject account at the third-party service to interact with the third-party service to bring functionality or data from those third-party services into various subject interfaces provided by the content management system 110.

While content management system 110 is presented with specific components, it should be understood by one skilled in the art that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art that the architectural configuration of system 100 is simply one possible configuration and that other configurations with more or fewer components are possible.

Client Synchronization Service

Figure 2:
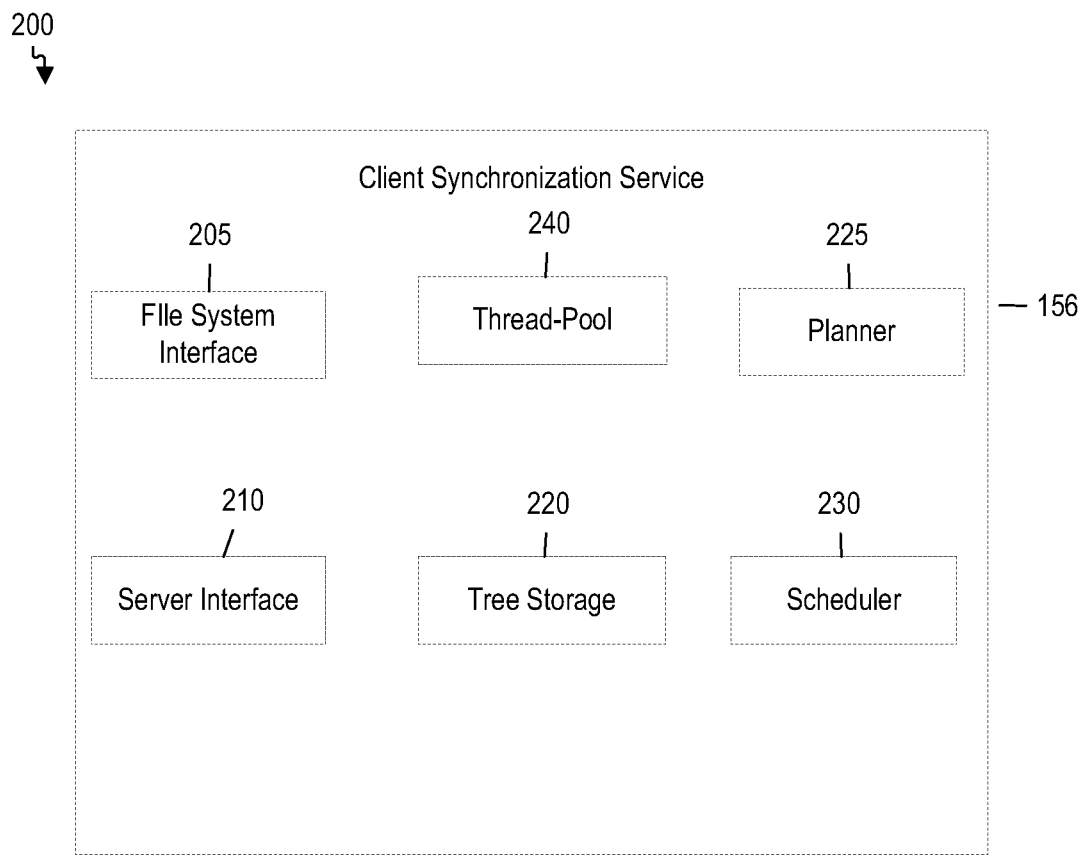
FIG. 2 shows an example of a client synchronization service in accordance with some aspects of the present technology.

FIG. 2 shows an example of a client synchronization service 156, in accordance with some embodiments. According to some embodiments, client synchronization service 156 may be implemented in the client device of FIG. 1. However, in other embodiments, client synchronization service 156 may be implemented on another computing device. Client synchronization service 156 is configured to synchronize changes to content items between a content management system and the client device on which client synchronization service 156 runs.

Client synchronization service 156 may include file system interface 205, server interface 210, tree storage 220, planner 225, scheduler 230, and thread-pool 240. Additional or alternative components may also be included. High-level descriptions of client synchronization service 156 and its components are discussed below with respect to FIG. 2. However, further details and embodiments of client synchronization service 156 and its components are discussed throughout.

File system interface 205 is configured to process changes to content items on the local filesystem of the client device and update the local tree. For example, file system interface 205 can be in communication with client synchronization service 156 of FIG. 1 to detect changes to content items on the local filesystem of the client device. Changes may also be made and detected via client application 152 of FIG. 1. File system interface 205 may make updates to the local tree. The updates to the local tree may be made based on the changes (new, deleted, modified, copied, renamed, or moved content items) to content items on the client device.

Server interface 210 is configured to aid in the processing of remote changes to content items at a remote storage system of the content management system and updating the remote tree. For example, server interface 210 can be in communication with server synchronization service 112 of FIG. 1 to synchronize changes to content items between client device 150 and content management system 110. Changes (new, deleted, modified, copied, renamed, or moved content items) to content items at content management system 110 may be detected, and updates may be made to the remote tree to reflect the changes at content management system 110.

Tree storage 220 is configured to store and maintain the tree data structures used by client synchronization service 156. For example, tree storage 220 may store the local tree, the sync tree, and the remote tree. According to some embodiments, tree storage 220 may store the tree data structures in persistent memory (e.g., a hard disk or other secondary storage devices) as well as in main memory (e.g., RAM or other primary storage devices) in order to reduce latency and response time. For example, on start-up of the client device or client synchronization service 156, the tree data structures may be retrieved from persistent memory and loaded into main memory. Tree storage 220 may access and update the tree data structures on the main memory, and before the client device or client synchronization service 156 is shut down, tree storage 220 may store the updated tree data structures on persistent memory. Because main memory is expensive in cost and often limited in size on most client devices, additional technological improvements are implemented to decrease the footprint of the tree data structures on main memory. These technological solutions are described further below.

Planner 225 is configured to detect differences between the server state associated with the content management system and the file system state associated with the client device based on the state of the tree data structures. For example, planner 225 may determine if there is a difference between the remote tree and the sync tree. A difference between the remote tree and the sync tree indicates that an action performed remotely on one or more content items stored in the content management system has caused the server state and the file system state to become out of sync. Similarly, planner 225 may also determine if there is a difference between the local tree and the sync tree. A difference between the local tree and the sync tree indicates that an action performed locally on one or more content items stored on the client device has caused the server state and the file system state to become out of sync. If a difference is detected, planner 225 generates a set of operations that synchronize the tree data structures.

In some scenarios, a set of operations generated based on a difference between the remote tree and the sync tree and a set of operations generated based on a difference between the local tree and the sync tree may conflict. Planner 225 may also be configured to merge the two sets of operations into a single merged plan of operations.

Scheduler 230 is configured to take the generated plan of operations and manage the execution of those operations. According to some embodiments, scheduler 230 converts each operation in the plan of operations into a series of one or more tasks that need to be executed in order to perform the operation. In some scenarios, some tasks may become outdated or no longer relevant. Scheduler 230 is configured to identify those tasks and cancel them. Thread-pool 240 is a pool of available resources that allows the multi-root structure of the current disclosure to operate with multiple independent root namespaces. According to some embodiments, the client synchronization service 156 is able to provide varying resources from the thread-pool 240 to each independent root namespace. This allows the system to prioritize certain synchronization processes that are important over less important synchronization processes. The thread-pool 240 allows the client synchronization service 156 to assign, schedule, and prioritize synchronization processes between the multiple root namespaces operated by the client synchronization service 156.

Tree Data Structures

Figure 3:
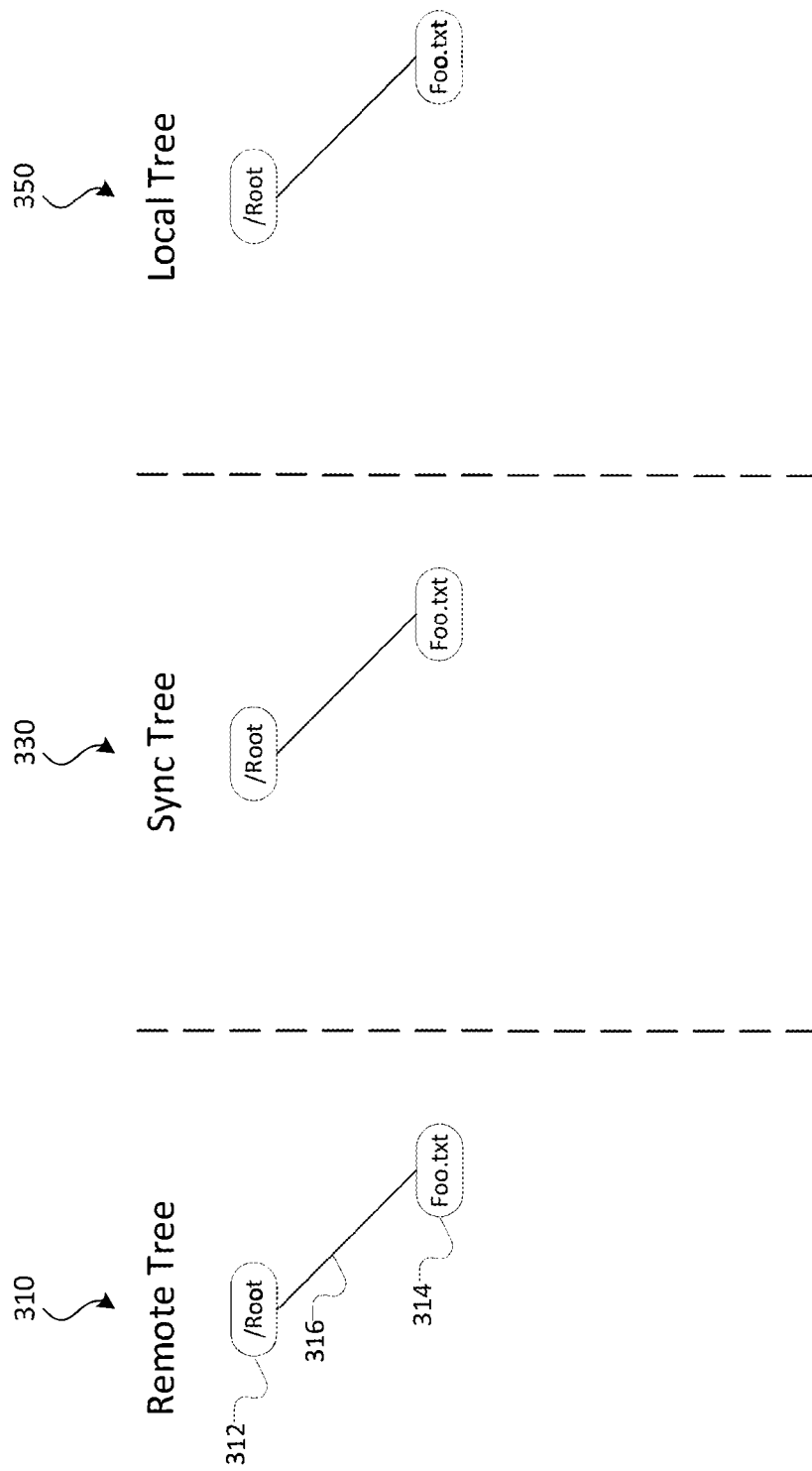
FIG. 3 shows an example of tree data structures in accordance with various embodiments.

FIG. 3 shows an example of tree data structures in accordance with various embodiments. The tree data structures may be stored at the client device and managed by a client synchronization service such as client synchronization service 156 in FIG. 2. In one example, the tree data structures can be stored at tree storage 220. In FIG. 3, the tree data structures are shown, including remote tree 310, sync tree 330, and local tree 350.

Remote tree 310 represents a server state or the state of content items stored remotely from the client device (e.g., on a server of the content management system). Local tree 350 represents a file system state or the state of the corresponding content items stored locally on the client device. Sync tree 330 represents a merge base for the local tree and the remote tree. The merge base may be thought of as a common ancestor of the local tree and the remote tree or a last known synced state between the local tree and the remote tree.

Each tree data structure (e.g., remote tree 310, sync tree 330, or local tree 350) may include one or more nodes. Each node may have one or more child nodes, and the parent-child relationship is represented by an edge. For example, remote tree 310 includes root nodes 312 and 314. Root node 312 is a parent of node 314, and node 314 is a child of root node 312. This parent-child relationship is represented by edge 316. A root node, such as root node 312, does not have a parent node. A leaf node, such as node 314, does not have a child node.

Each node in a tree data structure may represent a content item (e.g., a file, document, folder, etc.). For example, root node 312 may represent the root folder associated with the content management system, and node 314 may represent a file (e.g., a text file named "Foo.txt") located in that root folder. Each node in a tree data structure may contain data such as, for example, a directory file identifier ("DirFileID") specifying the file identifier of a parent node of the content item, a file name for the content item, a file identifier for the content item, and metadata for the content item. Each multi-root instance has its own root node 312.

As described above, a client synchronization service may determine that the server state and the file system state of the client device are synchronized when all three trees (e.g., remote tree 310, sync tree 330, and local tree 350) are identical. In other words, the trees are synchronized when their tree structures and the relationships that they express are identical, and the data contained in their nodes are identical as well. Conversely, the trees are not synchronized if the three trees are not identical. In the example scenario illustrated in FIG. 3, remote tree 310, sync tree 330, and local tree 350 are shown as being identical and synchronized, and, as a result, the server state and the file system state are synchronized.

Tracking Changes Using Tree Data Structures

Figure 4:
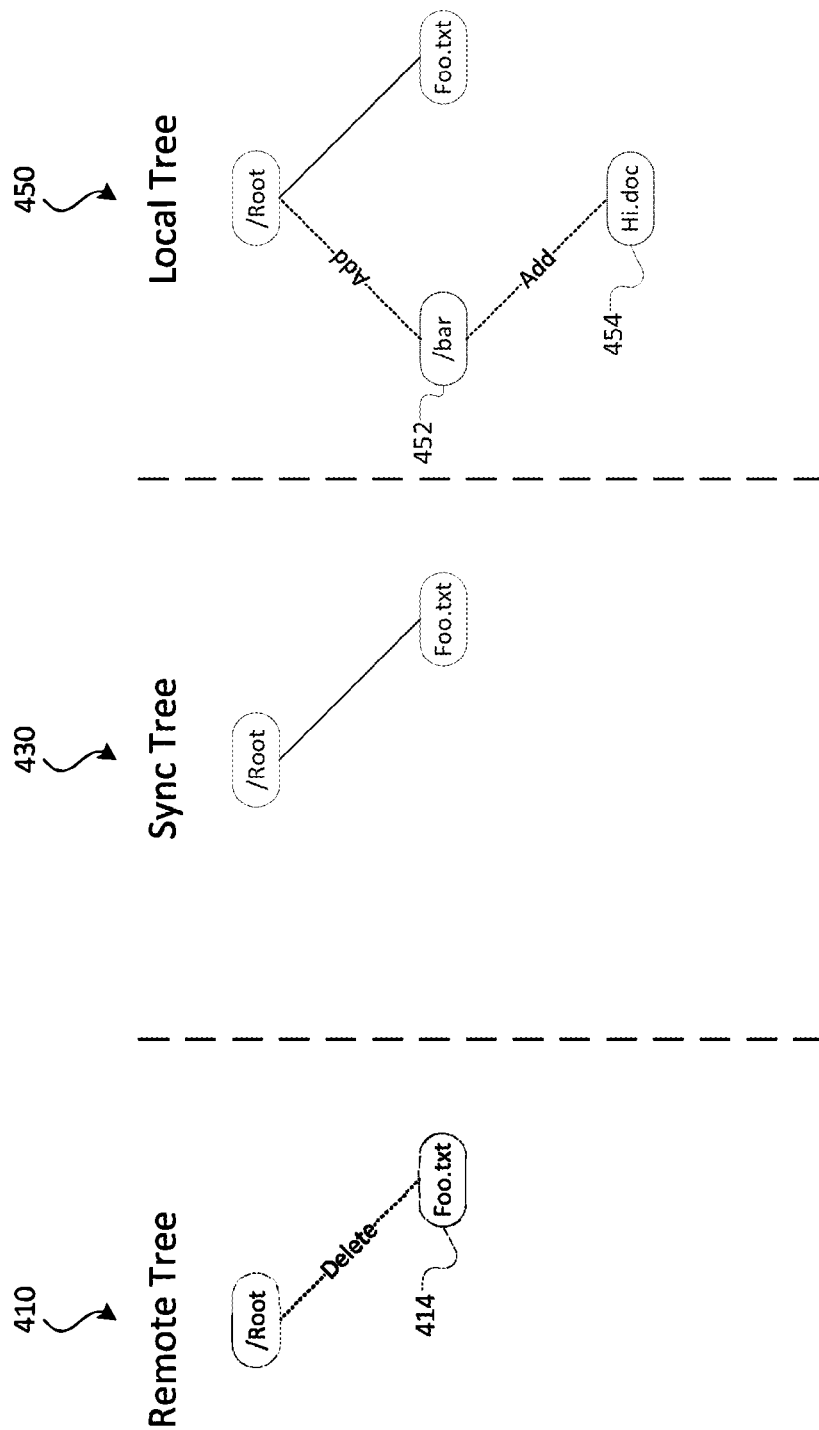
FIG. 4 shows an example of tree data structures in accordance with various embodiments.

FIG. 4 shows an example of tree data structures in accordance with various embodiments. As with the tree data structures shown in FIG. 3, the tree data structures shown in FIG. 4 (including remote tree 410, sync tree 430, and local tree 450) may be stored at the client device and managed by a client synchronization service such as client synchronization service 156 in FIG. 2. In FIG. 4, the tree data structures are shown.

FIG. 4 shows a scenario after a previously synchronized state, such as the scenario illustrated in FIG. 3, where additional actions are performed on the content items represented in the trees to modify the content items such that the trees are no longer in sync. Sync tree 430 maintains a representation of the previously known synchronized state and may be used by the client synchronization service to identify the differences between the server state and the file system state as well as generate operations for the content management system and/or the client device to perform to converge so that the server state and the file system state are synchronized.

For example, a user (the same user as the user associated with the client device or a different user with access to the content item) may make modifications to the "foo.txt" content item stored by the content management system. This content item is represented by node 414 in remote tree 410. The modification shown in the remote tree 410 is a removal (e.g., removal of the content item from a space managed by the content management system) or a delete of the foo.txt content item. These modifications may be performed, for example, on another client device and then synchronized to the content management system or performed through a web browser connected to the content management system.

When the change is made on the content management system, the content management system generates modification data specifying the change made and transmits the modification data to the client synchronization service on the client device. For example, using a push model where the content management system may transmit or "push" changes to the client device unilaterally. In other implementations, a pull model is where the server sends the changes in response to a request by the client device. Additionally, a hybrid model involves a long pull where the client device initiates the requests but keeps the connection open for a period of time so the content management system can push additional changes as needed while the connection is live. The client synchronization service updates the remote tree representing the server state for the content items stored by the content management system based on the modification data. For example, in remote tree 410, node 414, representing the foo.txt content item, is shown as deleted.

The client synchronization service may identify a difference between remote tree 410 and sync tree 430 and, as a result, determine that a modification of the content items at the content management system has caused the server state and the file system state to no longer be in sync. The client synchronization service may further generate and execute a set or sequence of operations for the content items stored on the client device that is configured to converge the server state and the file system state so that they will be in sync.

Additionally or alternatively, a user (the same user as the user associated with modifications at the content management system or a different user with access to the content item) may make modifications to the content items stored locally on the client device that are associated with the content management system. For example, the user may add a folder "/bar" to the "/root" folder and add a "Hi.doc" document to the "/bar" folder.

When the change is made on the client device, the client device (e.g., client synchronization service 156 or client application 152 of FIG. 1) generates modification data specifying the change made. The client synchronization service updates the local tree representing the file system state for the content items stored on the client device based on the modification data. For example, in local tree 450, node 452 and node 454 are shown as added. Node 452 and node 454 represent the "/bar" folder and the "Hi.doc" document, respectively.

The client synchronization service may identify a difference between local tree 450 and sync tree 430 and, as a result, determine that a modification of the content items at the client device has caused the server state and the file system state to no longer be in sync. The client synchronization service may further generate a set or sequence of operations for the content items stored by the content management system that is configured to converge the server state and the file system state so that they will be in sync. These operations may be transmitted to the content management system for execution.

As seen in FIG. 4, modifications to content items stored on the client device and content items stored by the content management system may occur at substantially the same time or within a particular time period. These modifications can be reflected in the tree data structures and used by the client synchronization service to generate operations for the client device and for the content management system in parallel. In other scenarios, however, modifications may not necessarily occur within the same time period, and operations may be generated in an as-needed manner. Furthermore, although FIG. 4 illustrates scenarios for adding content items and deleting content items, other types of modifications, such as editing, renaming, copying, or moving content items, are also supported.

According to various embodiments, identifying a difference between two tree data structures and generating operations may involve checking each node in both tree data structures and determining whether an action has been performed on the node. The actions may include, for example, the addition of the node, the deletion of the node, the editing of the node, or the moving of the node. These actions may then be used to generate the operations configured to converge the server state and the file system state.

For example, if the two tree data structures are a sync tree and a remote tree, the client synchronization service may identify each node in the sync tree by, for example, requesting the file identifiers of all nodes in the sync tree. For each node or file identifier for the node in the sync tree, the client synchronization service may determine if the node or file identifier is also in the remote tree. A node or file identifier in the sync tree that is not found in the remote tree may indicate that the node has been deleted from the server state that is represented by the remote tree. Accordingly, the client synchronization service may determine that a delete action has occurred on the remote tree. If the node or file identifier for the node is found in the remote tree, the client synchronization service may check whether the node in the remote tree has been edited or moved.

The client synchronization service may compare the metadata for the node in the sync tree with the metadata for the corresponding node (e.g., the node with the same file identifier) in the remote tree to determine whether the node in the remote tree has been edited with respect to the node in the sync tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. The metadata for the node in the sync tree may be compared with the metadata for the node in the remote tree. If the metadata does not match, an edit of the content item may have been edited in the server state represented by the remote tree. Accordingly, the client synchronization service may determine that an edit action has occurred for the node on the remote tree. If the metadata matches, no edit may have occurred.

The client synchronization service may compare the location for the node in the sync tree with the location for the corresponding node (e.g., the node with the same file identifier) in the remote tree to determine whether the node in the remote tree has been moved. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the server state represented by the remote tree. Accordingly, the client synchronization service may determine that a move action has occurred for the node on the remote tree.

The client synchronization service may identify any nodes or file identifiers in the remote tree that are not found in the sync tree to determine whether a node has been added to the remote tree. If a node or file identifier is found in the remote tree and not found in the sync tree, the client synchronization service may determine that an add action of this node has occurred on the remote tree representing the server state.

Although the example above is described with respect to the sync tree and the remote tree, in other embodiments, a similar process may occur with the sync tree and a local tree in order to identify a difference between the sync tree and the local tree and determine which actions have occurred on the local tree representing the file system state.

Synchronization Using Tree Data Structures

Figure 5:
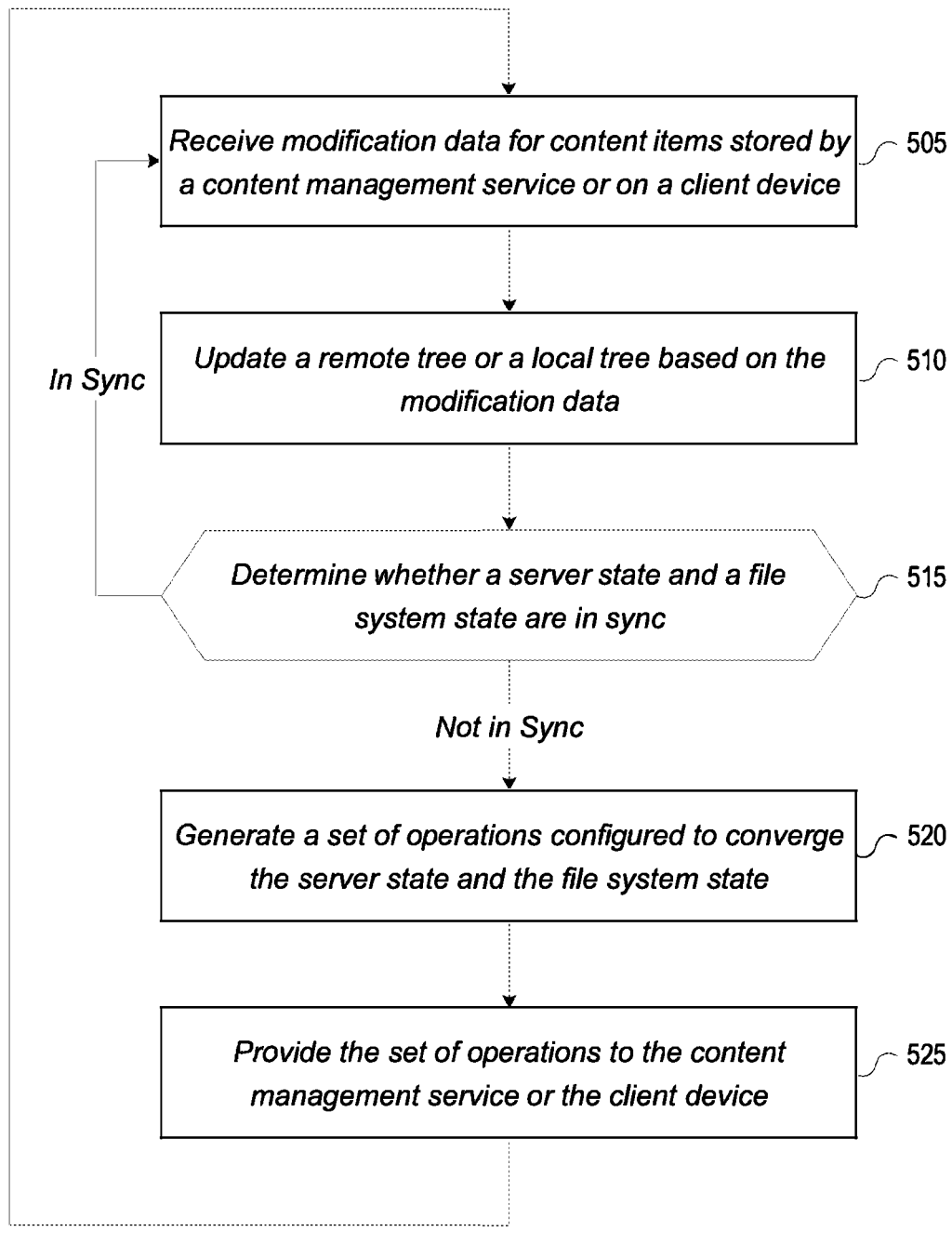
FIG. 5 shows an example method for synchronizing a server state and a file system state using tree data structures in accordance with various embodiments of the subject technology.

FIG. 5 shows an example method for synchronizing a server state and a file system state using tree data structures in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 500 may be implemented by a system such as, for example, client synchronization service 156 of FIG. 2, running on a client device.

The system is configured to identify a difference between a remote tree representing a server state for content items stored by the content management system, a local tree representing the file system state for the corresponding content items stored on the client device, and a sync tree representing a known synced state between the server state and the file system state. Based on these differences, a set of operations may be generated that, if executed, are configured to converge the server state and the file system state towards a synchronized state where the three tree data structures would be identical.

For example, at operation 505, the system may receive modification data for content items stored by a content management system or on a client device. The modification data may be used to update a remote tree or a local tree at operation 510.

The modification data specifies what changes occurred to one or more content items associated with a content management service. Accordingly, the modification data may be received from the content management system or from the client device (e.g., from client application 152 running on the client device 150 in FIG. 1). Modification data received from the content management system may be referred to as server modification data. Server modification data specifies what changes are done to one or more content items by the content management system and may be used to update the remote tree at operation 510. Modification data received from the client device may be referred to as client modification data. Client modification data specifies what changes are done to one or more content items on the client device and may be used to update the local tree at operation 510.

At operation 515, the system may determine if a server state for content items stored by the content management system and a file system state for the content items stored on the client device are in sync. Because the local tree and the remote tree are representative of the file system state and the server state, respectively, and because they are continually being updated to track changes that occur at the content management system 110 and the client device 150, determining whether the server state and the file system state are in sync may be done by comparing the local tree and/or the remote tree to the sync tree to find differences between the trees. This process of finding differences between the trees is sometimes referred to as "diffing" the trees.

According to some embodiments and scenarios, determining whether the server state and the file system state are in sync may include one or more of identifying differences between the remote tree and the sync tree and/or identifying differences between the local tree and the sync tree. Differences between the remote tree and sync tree may indicate the occurrence of changes to content items stored by the content management system that may not be reflected at the client device. Similarly, differences between the local tree and sync tree may indicate the occurrence of changes to content items stored at the client device that may not be reflected at the content management system.

If there are no differences between the trees, the server state and the file system state are in sync, and no synchronization actions are needed. Accordingly, the method may return to operation 505 and await new modification data. On the other hand, if differences are detected, the system may generate a set of operations configured to converge the server state and the file system state at operation 520.

The set of operations generated depends on one or more differences that are detected. For example, if the difference between two trees is an added content item, the generated set of operations may include retrieving the added content item and adding it. If the difference between two trees is a deletion of a content item, the generated set of operations may include deleting the content item. According to some embodiments, the set of operations may also include a number of checks to ensure tree constraints are maintained. As will be described further below, the set of operations may conflict with the current state of the server state, the file system state, or other operations that are pending execution. Accordingly, the system may also resolve these conflicts before proceeding.

As noted above, if there are differences between the remote tree and sync tree, changes to content items stored by the content management system may have occurred that may not be reflected at the client device. Accordingly, in this scenario, the system may generate a client set of operations configured to operate on the content items stored on the client device to converge the server state and the file system state, and this client set of operations may be provided to the client device for execution at operation 525.

Similarly, if there are differences between the local tree and sync tree, changes to content items stored at the client device may have occurred that may not be reflected at the content management system. Accordingly, in this scenario, the system may generate a server set of operations configured to operate on the content items stored by the content management system to converge the server state and the file system state, and this server set of operations may be provided to the content management system for execution at operation 525. In some cases, both cases may be true, and a client set of operations and a server set of operations may be generated and provided to their intended recipients at operation 525.

Once the set(s) of operations are provided to the intended recipient(s), the method may return to operation 505 and await new modification data. The set(s) of operations may provide one or more steps towards the convergence of the server state and the file system state or provide all steps needed to sync the server state and the file system state. For example, the content management system may receive the server set of operations and execute the server set of operations on content items stored by the content management system. This execution of the server set of operations causes changes to the content items stored by the content management system, which are detected and specified in server modification data, which is transmitted back to the system. The system may then update the remote tree and determine whether the server state and the file system state are in sync.

The client device may receive the client set of operations and execute the client set of operations on content items stored on the client device. This execution of the client set of operations causes changes to the content items stored on the client device, which are detected and specified in client modification data, which is passed to the system. The system may then update the local tree and determine whether the server state and the file system state are in sync. These operations of method 500 may continue until the server state and the file system state are in sync.

The operations of method 500 are described with respect to a client-side and a server-side (e.g., a local tree and a remote tree, a file system state and a server state, a client set of operations and a server set of operations, client modification data and server modification data). In various embodiments, the operations associated with the two sides may occur in parallel, in sequence, in isolation of the other side, or a combination of the operations.

As will be discussed in further detail, in accordance with some embodiments, before the operations are provided for execution, the system may check the operations to determine whether they comply with a set of rules or invariants. If an operation violates a rule, the system executes a resolution process associated with the violation of the rule.

Additionally, in accordance with some embodiments, the system (e.g., scheduler 230 of client synchronization service 156 in FIG. 2) may manage the execution of the set of operations. For example, each operation in the set of operations may be associated with a task, an execution thread, a series of steps, or instructions. The system may be configured to execute the task, thread, step, or instructions and interface with the client device and/or the content management system to execute the set of operations and converge the server state and the file system state.

Conflict Handling

As described above with respect to FIG. 5, differences between a sync tree and a remote tree are identified and used to generate a client set of operations configured to converge the server state and the file system state. However, in some cases, the client set of operations may conflict with the current state of a local tree. Similarly, differences between the sync tree and the local tree are identified and used to generate a server set of operations configured to converge the server state and the file system state. However, the server set of operations may conflict with the current state of the remote tree. Additionally or alternatively, the client set of operations and the server set of operations may conflict with one another or violate another rule or invariant maintained by the system. Accordingly, various embodiments of the subject technology provide additional technical improvements by resolving these conflicts.

For example, planner 225 in client synchronization service 156 of FIG. 2 may identify an operation in a set of operations (e.g., the client set of operations or the server set of operations) that conflicts with a rule. Each rule used to identify a conflict may also be associated with a resolution for the conflict. The client synchronization service may update the set of operations based on the resolution for the conflict or resolve the conflict by performing operations associated with the resolutions for the conflict before providing the set of operations for execution.

Figure 6:
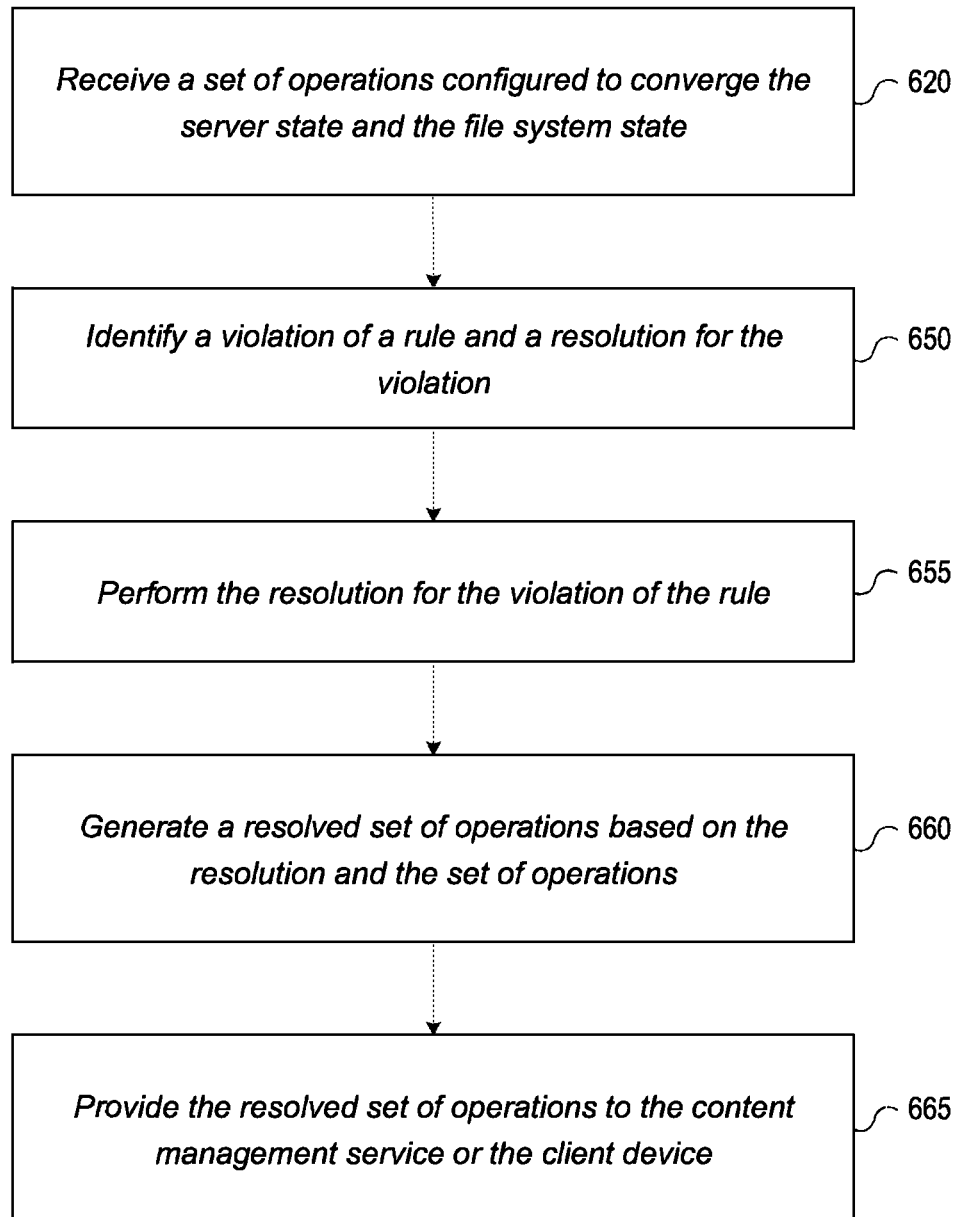
FIG. 6 shows an example method for resolving conflicts when synchronizing a server state and a file system state using tree data structures in accordance with various embodiments of the subject technology.

FIG. 6 shows an example method 600 for resolving conflicts when synchronizing a server state and a file system state using tree data structures in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client synchronization service 156 of FIG. 2, running on a client device.

The system may receive a set of operations configured to converge a server state and a file system state at operation 620. The set of operations may be, for example, the client set of operations, the server set of operations, or a combined set of operations generated and described with respect to the method 500 of FIG. 5.

At operation 650, the system identifies one or more violations in the set of operations based on a set of rules. The set of rules may be stored by client synchronization service 156 in FIG. 2 and specify a number of constraints, invariants, or conflicts for operations that are to be resolved. The set of rules may be applied to the tree data structures and help control synchronization behavior. Each rule in the set of rules may also be associated or otherwise linked to a resolution to a violation of that rule. For example, the resolution may include an alteration of one or more operations in the set of operations, a removal of one or more operations, an addition of one or more operations, one or more additional actions to the server state or the file system state, or a combination of actions.

For each operation in a set of operations, the system may determine whether any rule in the set of rules is violated. If a rule is violated, the system identifies a resolution of the violation and, at operation 655, performs the resolution. The resolution may include actions such as modifying one or more operations in the set of operations, removing or adding one or more operations, or additional actions on the server state or the file state.

Once the resolution actions are performed, the system may generate a resolved or rebased set of operations based on the resolution and the set of operations at operation 660 and, at operation 665, provide the resolved set of operations to the appropriate entity for execution. For example, the resolved set of operations may be provided to scheduler 230 of client synchronization service 156 in FIG. 2 for managed execution. Alternatively, if the set of operations is a client set of operations, the resolved set of operations may be provided to the client device. If the set of operations is a server set of operations, the resolved set of operations may be provided to the content management service. Additionally, the method 600 of FIG. 6 may be performed on client set of operations and server set of operations in sequence, in parallel, or in various different orders.

According to some embodiments, each type of operation may be associated with the same or a different set of rules. For example, operation types may include, for example, adding a content item, deleting a content item, editing a content item, moving a content item, renaming a content item, etc. The set of operations may consist of operations, each belonging to one of the operation types above. Each operation type may be associated with a specific set of rules.

For illustrative purposes, a set of rules for an "Add" operation type may include rules such as file identifiers for content items must be unique in a tree (e.g., no two nodes in a tree may have the same file identifier), a directory file identifier ("DirFileID") specifying the file identifier of a parent node of the content item must exist in the opposite tree data structure, and a DirFileID and file name combination for a content item are not used in the opposite tree.

Opposite tree, as used here, refers to the tree data structure that represents the state of the opposing entity. For example, a client set of operations configured to operate on the client device and the resulting changes to the file system on the client device will be reflected in the local tree. Accordingly, the opposite tree for the client set of operations is the remote tree. Similarly, a server set of operations is configured to be transmitted to the content management system to be executed, and the resulting changes to the server state will be reflected in the remote tree. Accordingly, the opposite tree for the server set of operations is the local tree.

Multi-Root System

Figure 7:
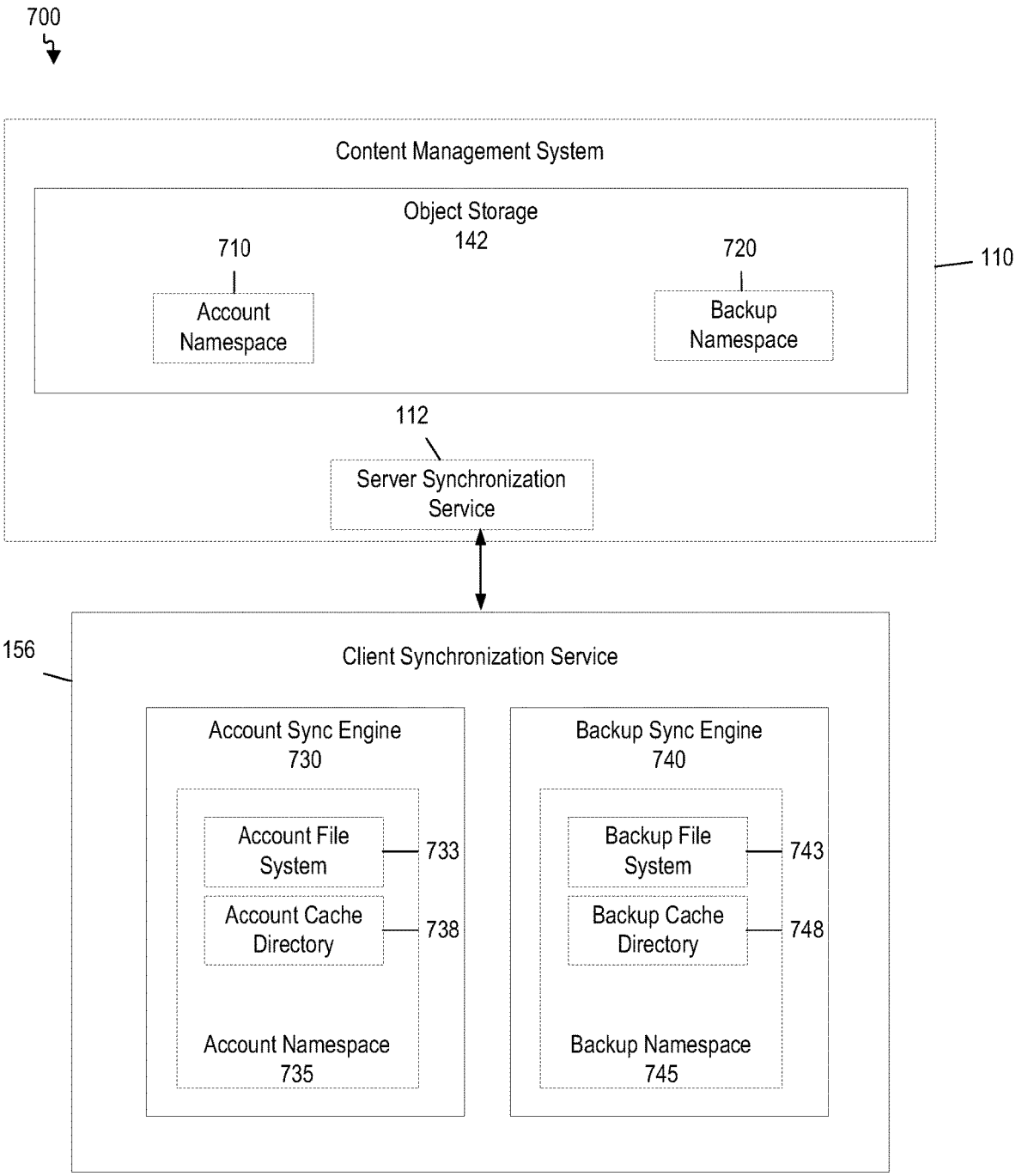
FIG. 7 illustrates an example of a multi-root client synchronization system in accordance with some aspects of the present technology.

FIG. 7 shows an example of a multi-root synchronization system 700, in accordance with some embodiments. Multi-root synchronization system 700 includes an object storage database 142, as shown in FIG. 1, a server synchronization service 112, as shown in FIG. 1, and a client synchronization service, as shown in FIG. 2. In object storage database 142, the content management system 110 includes root namespaces associated with a user account: in this example, one is the account namespace 710, and the second is backup namespace 720. However, while only two root namespaces are shown in FIG. 7, it is possible for the user to add additional backup drives, for example, and each of those backup drives would have its own backup namespace reflected in the content management system 110. In one example, backup namespace 720 has its own file storage that is synchronized with backup namespace 745 associated with an external storage device 151 (e.g., phone, tablet, external hard drive, laptop, computing device, etc.) at object storage database 142. By providing separate root namespaces, one for account namespace 710 and one for backup namespace 720, each root namespace can be independently synchronized. For example, account namespace 710 at content management system 110 is synchronized with account namespace 735 on the client device 150 independently of backup namespace 720 at content management system 110 being synchronized with backup namespace 745 on an external storage device 151. As stated above, this also works with additional root namespaces, where each additional root namespace would be synchronized independently of the account namespace 735 and backup namespace 745. The synchronization engines can independently communicate with client synchronization service 156, which coordinates with server synchronization service 112 to determine when a namespace requires synchronization.

In some embodiments, a root namespace in the multi-root architecture can appear to be mounted underneath another root namespace to give the appearance of a single file system structure. This can occur when an account has access to a plurality of root namespaces. However, while this file system structure may provide easy and comfortable navigation for a user, it does not control the number of root namespaces used in a multi-root architecture. Even when graphically presented as a single file system structure, each root namespace maintains its independence and continues to utilize its independent instances of the synchronization engine. By maintaining independent root namespaces, the multi-root system can continue to support and synchronize root namespaces with different permissions, availabilities, or synchronization modes while providing an easy to use interface.

In some embodiments, server synchronization service 112 and server interface 210 (not shown) of client synchronization service 156 are configured to process changes to content items received by the content management system 110. For example, the content management system 110 can independently update the changes to account namespace 710 and the changes to backup namespace 720, when changes are received. The server interface 210 (not shown) of FIG. 2 can communicate with server synchronization service 112 of FIG. 1 to synchronize changes to content items at either client device 150 or content management system 110. Server synchronization service 112 can detect changes (new, deleted, modified, copied, renamed, or moved content items) to content items in account namespace 710 and can communicate the changes to account namespace 735 to update account file system 733. Similarly, server synchronization service 112 can detect changes (new, deleted, modified, copied, renamed, or moved content items) to content items in backup namespace 720 and can communicate the changes to backup namespace 745 to update backup file system 743.

Client synchronization service 156 may be implemented in the client device 150 of FIG. 1. However, in some embodiments, client synchronization service 156 may be implemented on another computing device or the process shared between multiple devices. For example, in some embodiments, the external storage device 151 can share processing or run client synchronization service 156. Client synchronization service 156 is configured to synchronize changes to objects between content management system 110 and client device 150 on which client synchronization service 156 runs. Client synchronization service 156 may include file system interface 205, server interface 210, tree storage 220, planner 225, scheduler 230, and thread-pool 240, as shown in FIG. 2. Additional or alternative components may also be included, and it is possible for the components to be run in parallel, combined, or omitted as needed.

In some embodiments, the client synchronization service 156 communicates with both the client device 150 and the external storage device 151. In one example, under a multi-root system, client synchronization service 156 runs each root namespace, and each root namespace runs its own instance of the synchronization engine, e.g., account synchronization engine 730 and backup synchronization engine 740 in FIG. 7. In this example, each synchronization engine runs its own instance of the synchronization process. Further, the file systems and cache directories are unique to each root namespace, and the file system and cache directory for a specific root namespace are synchronized via the instance of the synchronization engine associated with that root namespace. By running individual instances of the synchronization engine to independently synchronize the file systems and cache directories, the client synchronization service 156 can operate each instance of the synchronization engine independently, which facilitates prioritization between devices, different schedules between devices, different data synchronized, and different files synchronized, amongst other differences.

In some embodiments, the account synchronization engine 730 is an independent instance of the synchronization engine that supports independent and bi-directional synchronization. The account synchronization engine 730 can reside on the client device 150 and operate the synchronization processes on the client device for the account namespace 735. The account namespace 735 on client device 150 is synchronized with the account namespace 710 on the content management system 110 using the account synchronization engine 730. The account namespace 735 includes an account file system 733 and an account cache directory 738. The account file system 733, which is associated with account namespace 735, is an independent file system directory for the user account at client device 150. Furthermore, the account namespace 735 has its own account cache directory 738, which allows the account namespace 735 to properly and independently use its own cache when synchronizing and/or making appropriate changes to the account file system 733.

In some embodiments, like those shown in FIG. 1, at least one external storage device 151 is connected to client device 150 to, for example, back up certain files from the external storage device 151. However, in a single namespace system, the synchronization engine running on client device 150 treats the file system of the client device and the file system of the external storage device as a single file system for synchronization purposes. When a client device has only a single synchronization engine for a single file system, the content management system cannot differentiate between the file system of the client device 150 and the file system of the external storage device 151. To solve this problem, a multi-root structure can be implemented where, in addition to an instance of the synchronization engine for account namespace 735, backup namespace 745 includes a second instance of the synchronization engine. Under this multi-root architecture, the backup synchronization engine 740 is associated with its own root namespace, e.g., backup namespace 745, which has its own backup file system 743 and backup cache directory 748. The backup synchronization engine 740 operates independently of the account synchronization engine 730 but is able to share resources through the thread-pool 240 of FIG. 2 as part of the client synchronization service 156. Furthermore, because it has its own backup synchronization engine (e.g., backup synchronization engine 740), backup namespace 745 can be independently synchronized with backup namespace 720 at the content management system 110. An independent synchronization engine also allows for backup namespace 745 to independently monitor backup file system 743 and backup cache directory 748 for changes, and allows backup namespace 745 to have a different structure and backup process than other namespaces associated with the client synchronization service 156 (e.g., account namespace 735).

Furthermore, the content management system using a multi-root architecture can define a root namespace as any file system with independent access privileges. A file system directory that inherits access privileges from another file system directory would be a sub-directory. In a multi-root system, a single user account can have multiple root namespaces. For example, in FIG. 7, the client device 150 has account namespace 735 with account file system 733 and an account cache directory 738, while the external storage device 151 has a backup namespace 745 with backup file system 743 and backup cache directory 748. Within a multi-root system, a root namespace has its own file system and its own cache directory. Providing independent root namespaces allows the content management system to treat each root namespace independently, where processes don't cross between the file system boundaries. Further, the multi-root architecture allows the content management system to provide independent processes to individual root namespaces, which provides individualized control of that root namespace. For example, each root namespace can have its own synchronization engine that shares resources through the client synchronization service 156 with each connected device. In one example, each root namespace is synchronized with the content management system 110, where the object storage database 142 stores the synchronized content items on the cloud.

Because the backup namespace 745 of FIG. 7 has its own independent instance of the synchronization engine, e.g., the backup synchronization engine 740, the multi-root system can customize and optimize processes carried out by backup synchronization engine 740 for specific types of backup devices. For example, external storage device 151 can be any type of external backup device, including a portable external hard drive, a laptop or desktop computer, a mobile device, a tablet, a home server, etc. Different external devices can have different capabilities based on the type of file system or different read/write abilities available. External drives can have different file system structures, e.g., FAT32, exFAT, or NTFS, each with its own advantages and disadvantages. Each type of external drive can require the system to provide different operations to maximize the capabilities of that file structure. NTFS may allow for larger files and partitions, as well as more sophisticated file permissions and error recovery, while exFAT may not support every system call, and FAT32 has limitations on file sizes and partition sizes but provides more support for read and write capabilities. The content management system can customize a synchronization engine for each type of storage device connected to client device 150, which allows for maximum flexibility in determining efficiency, security, and synchronization modes and algorithms for those devices. Further, by customizing the synchronization engine for each device, the content management system can support multiple types of backup drives for the same user account. A user could use an exFAT external backup for home backup and have an NTFS external backup for work backup. The content management system can independently customize the synchronization engine to optimize the synchronization for each external backup without having to sacrifice performance caused by using differing backup drive storage structures.

Independent and customizable synchronization engines also allow the content management system to optimize for client device performance as well. The client devices typically have increased functionality compared to external drives, including larger file sizes, partition sizes, different file system calls, etc. Instead of having a single synchronization engine limited by the most limited component, a multi-root system runs an optimized instance of the synchronization engine for each client device and each external storage device.

Another further example consistent with using an independent instance of a synchronization engine is that the files associated with each namespace can be independently synchronized with the synchronization engine for that namespace. For example, because the backup synchronization engine 740 processes changes at backup namespace 745, which includes backup file system 743, the backup synchronization engine 740 is able to identify changes at backup namespace 745 and synchronize those changes with the backup namespace 720 on content management system 110. Furthermore, because each root namespace is independent of the other, when the backup synchronization engine 740 identifies changes in backup file system 743, the backup synchronization engine 740 can transmit those changes, through client synchronization service 156, to content management system 110, even if there are no changes on any other root namespaces, e.g., account namespace 735. By using independent instances of the synchronization engine for each root namespace, the system is able to identify changes, communicate those changes to the server, and implement those changes on the server, thereby synchronizing the external storage device with the content management system without impacting any other root namespace in the system.

Independent synchronization engines also enable the synchronization engine to only synchronize the files that are requested to be synchronized. For example, there are some circumstances where a user may want to synchronize a subset of content items to the content management system 110. The system of the current disclosure can provide this benefit to the user through an allow file in the file system directory. Previously, when a backup synchronization request was received, the system would scan the entire backup file system directory for changes and synchronize the changes identified. Using a multi-root architecture allows the backup synchronization engine 740 of FIG. 7 to store an allow executable file that identifies a file(s) or folder(s) that the synchronization engine needs to check for changes. Files or folders not identified by the allow file will not be checked for changes or synchronized. The allow file can be stored in the backup file system 743. When the backup synchronization engine identifies allowed files in a file system, the synchronization engine will scan the identified allowed files to recognize any changes. The synchronization engine would synchronize the changes in the identified allowed files and ignore file(s) and folder(s) that does not include an allow file, even if there are changes to those file(s) or folder(s). The improvements allowed by having independent instances of a synchronization engine can be useful in a number of contexts, including under circumstances where the client device 150 has limited power available, limited connectivity, or is in a location that would not typically permit synchronization due to security concerns, and therefore the user wants to limit synchronization activity. Allow files can also be useful when a user does not want to synchronize an entire backup file system with the content management service due to space constraints or privacy concerns.

A further benefit of the multi-root system is the ability to provide in-place restorations for the external storage device 151. The backup namespace 745 has an independent backup cache directory 748 that the backup namespace 745 can utilize to implement an in-place restoration. In single root namespace systems, the client device 150 and external storage device 151 operate with a single root namespace and use a cache directory stored on the client device 150 to implement synchronization. In a single root namespace system, if the synchronization system provides a restoration for a file or folder in external storage device 151, the synchronization engine downloads and stores the synchronization data at the cache directory in client device 150 and then copies the data over to the external storage device 151 after the download is complete. Using the client device cache directory raises a number of problems. For example, if the client device loses power, the operating system or the software crashes, the internet connection is lost, or the synchronization process is otherwise interrupted, the data being copied to the external device becomes corrupted because only part of the file has been copied. A multi-root system solves this problem and improves the functionality of the synchronization process.

In the multi-root system presently described, every root namespace has a cache directory and synchronization engine. For example, backup namespace 745 has backup synchronization engine 740 and backup cache directory 748. In the multi-root system, synchronization is handled by backup synchronization engine 740 and client synchronization service 156. For example, when the synchronization process is running at backup synchronization engine 740, the content item is downloaded to the backup cache directory 748, where it is temporarily stored. Once the content item is fully downloaded, it is moved to the backup file system 743 for storage, where it can replace an existing version of the content item. This move from the backup cache directory to the backup file system is an atomic operation that does not get interrupted like a copy would in a single root namespace system. By independently operating synchronization engines and each root namespace having it sown cache directory, it is now possible to provide in-place restoration to external storage devices.

The multi-root system also allows for the synchronization of data directly from the content management system with the external storage device 151. The independent cache directory also allows for the replacement of files on the external storage device 151 and the ability to recreate the files from a previous point in time. For example, using the multi-root system of FIG. 7, a user could access the backup namespace 720 via browser-based access and make changes or add files to backup namespace 745 on external storage device 151. In single root namespace systems, this is not possible as the single root namespace and synchronization engine are run on the client device and would not provide access to the content items on the external storage device.

Another benefit of the described multi-root system is that the client device 150 or client synchronization service 156 can maintain a list of paths for each root namespace associated with the client synchronization service 156. For example, client device 150, client synchronization service 156, and/or content management system can include a database listing the root namespaces that have been synchronized with the content management system 110. When an external drive, e.g., external storage device 151, is connected to client device 150, client synchronization service 156 can check the database to determine if external storage device 151 has been synchronized with the content management system previously or if external storage device 151 is being added for the first time.

The database can include paths, unique identifiers, or any other method for identifying and determining if the added device is known to the system. By identifying external devices known to the client synchronization service 156, the client synchronization service 156 can continue operations for synchronizing a known external drive. Once recognized, client synchronization service can, for example, identify external storage device 151 and initiate synchronization with backup synchronization engine 740. Backup synchronization engine 740 can be on the client device 150 or the external storage device 151, depending on the capabilities of the external storage device and how the client synchronization service is set up. In this example, backup namespace 745 is recognized by the client synchronization service 156, and therefore the backup synchronization engine 740 can continue synchronization from where synchronization was previously stopped or paused. Resuming synchronization can also be facilitated by storing the backup synchronization engine 740 on the external storage device 151. The backup synchronization engine stored on the external storage device 151 is able to store state information that identifies the state of the synchronization when it is interrupted, which allows the backup synchronization engine to resume from the stored synchronization state. Because backup synchronization engine 740 can continue synchronization from a previous stopping point, the system avoids redundancy and waste associated with having to recognize and synchronize an entire backup drive when some of that information was already synchronized with the content management system.

Checking the database to determine if a backup device is known also allows the client synchronization service 156 to recognize a backup device as new and begin the process of creating a new root namespace for the new external storage device. The client synchronization service 156 is subscribed to the system file events, where the client device 150 identifies the new device, and client synchronization service 156 can take that information and create a new root namespace. For example, once the file system events recognizes the new file directory, the client synchronization service can create a new namespace and a new instance of the synchronization engine to recognize and synchronize the files in the new file directory. The client synchronization system would also identify the type of external storage device and assign the parameters for the synchronization engine based on the file structure available. Once the new instance of the synchronization engine is established, the client synchronization service will add the new external device to the database so that it is known to the content management system if it is connected to the client synchronization service in the future.

Still, another benefit of the multi-root system is that by having multiple root namespaces, each with its own instance of the synchronization engine, the client synchronization service 156 can customize the data being provided between the synchronization service and the external storage device 151. In one example, if the external storage device 151 doesn't support icons, then the system would not need to store icon data for backup file system 743 at the backup namespace 745 on external storage device 151. Similarly, each instance of the synchronization engine can run its own customized synchronization algorithm. For example, a synchronization algorithm running on a file system that supports extended attributes, sometimes referred to as xattrs, may be different from the synchronization algorithm on a file system that does not support extended attributes. A multi-root system also allows the system to delete a file on the local device, e.g., external storage device 151, without needing to delete the file on the backup namespace 720 stored in the content management system.

Finally, it is possible to introduce specific operations for each instance of the synchronization engine within the multi-root system. For example, a user may set synchronization parameters for backup synchronization engine 740 to only synchronize backup namespace 745 in FIG. 7 overnight, when the user is not actively using the system. However, for content items in the account namespace 735, the user may set synchronization parameters for account synchronization engine 730 that provides for synchronization to take place continuously as changes are made to account file system 733. Using independent synchronization engines allows the system to accept scheduling for each instance of the synchronization engine. By independently setting schedules for each synchronization engine, the client synchronization service 156 is able to allocate and optimize resources, e.g., thread-pool 240, provided to each instance of the synchronization engine. The multi-root system also allows the system to provide individual feedback on synchronization based on the instance of the synchronization engine. For example, typically with external drives like external storage device 151, a synchronization system provides high-level generic information (e.g., synchronization is ongoing or complete, etc.) because the synchronization system doesn't have access to the data necessary to provide further details about the status of synchronization. However, when the instance of the synchronization engine, e.g., backup synchronization engine 740, is running on the client synchronization service, the synchronization engine can provide specific information to client synchronization service 156 that enables the synchronization system to identify more granular information down to the file level. For example, backup synchronization engine 740 can identify which changes to content items in the backup file system 743 have been implemented and which changes are still queued for synchronization.

The multi-root architecture also provides benefits to sharing resources like, e.g., thread-pool 240 and network resources. The client synchronization service 156 of FIG. 7 is able to control the operation of each instance of the synchronization engine. This allows client synchronization service 156 to prioritize synchronization for specific files or namespaces. For example, client synchronization service 156 is able to pause any synchronizations taking place at backup synchronization engine 740 and provide the full system resources to a priority synchronization identified by account synchronization engine 730. Prioritization of synchronization tasks is possible with more than two instances of the synchronization engine, with the upper limit being guided by the attributes of the client device 150 and external storage device(s) 151 rather than the client synchronization service 156. Prioritization can also work dynamically, where the synchronization engines for each namespace are paused or resumed based on available resources as well as when higher priority tasks are completed, the resources can be dynamically shifted to the next highest priority task.

In one embodiment there can be ten instances of the synchronization engine. In that case, the system can pause nine instances to focus all the resources on the most important, most timely, or chosen synchronization engine instance synchronizing priority changes. In another example, the multi-root system could run five of the ten instances, adding and pausing instances depending on the priority of the next available task that requires synchronization. Individualized synchronization engines also allow the system to cancel synchronization tasks based on the instance of the synchronization engine rather than having to cancel all synchronization tasks in a single root system. For example, suppose there is an error or mistake at an individual instance of the backup synchronization engine 740. In that case, the system only needs to perform remedial measures or cancel the synchronization tasks from backup synchronization engine 740 while leaving all other instances to operate normally. This is in contrast to a single root system where an error at any individual file system would necessitate restarting the entire process for all file systems, even if the error was only part of a backup synchronization. By running unique and independent synchronization engines, the system can collect more refined data, store it, and use it to control the synchronization process better.

Figure 8:
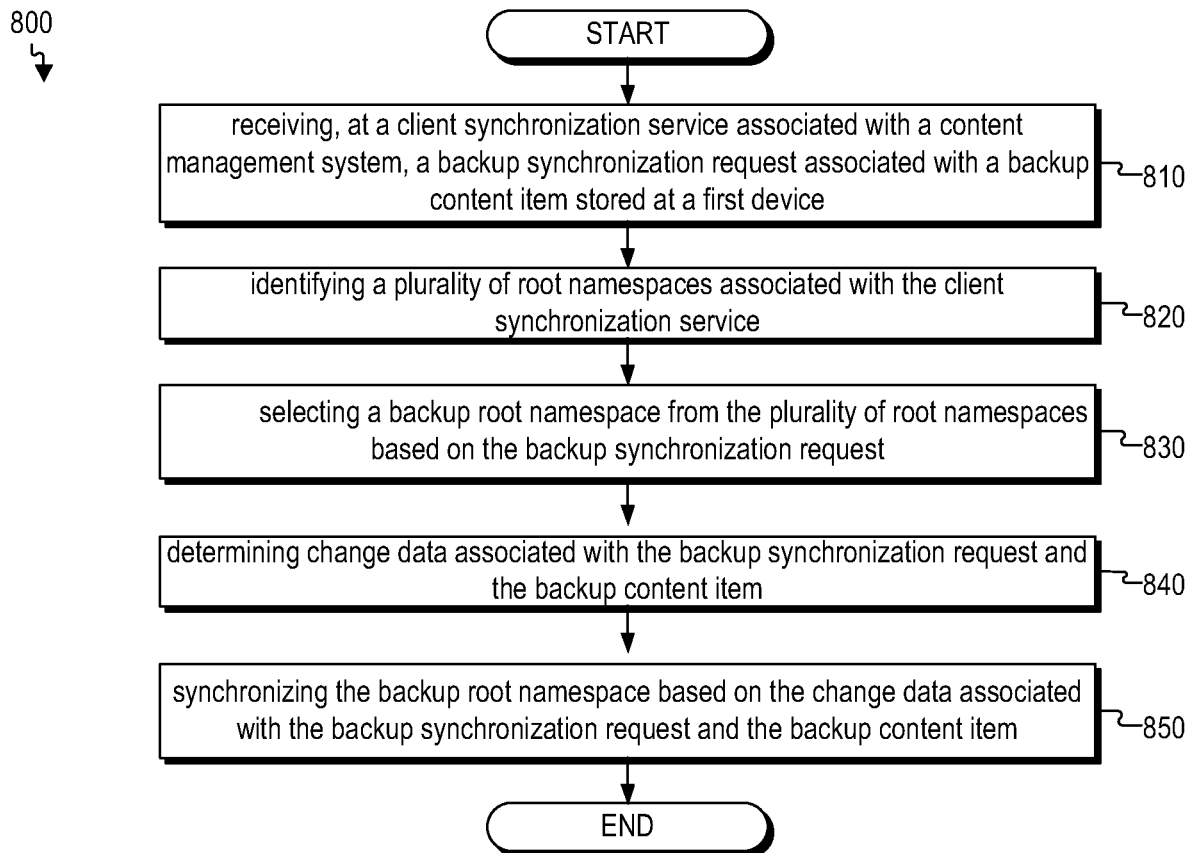
FIG. 8 illustrates an example method for synchronizing content items in a multi-root synchronization system in accordance with some aspects of the present technology.

FIG. 8 illustrates an example method 800 for implementing a multi-root synchronization system that includes a backup root namespace and account root namespace. Although the example method 800 depicts a particular sequence of operations, the sequence may be altered without departing from the scope of the present disclosure. For example, some of the operations described may be performed in parallel or in a different sequence that does not materially affect the function of method 800. In other examples, various components of an example device or system that implements method 800 may perform tasks at substantially the same time or in a specific sequence.

According to some embodiments, the method includes receiving, at a client synchronization service associated with a content management system, a backup synchronization request associated with a backup content item stored at a first device at block 810. In FIG. 7, client device 150 operates an instance of the synchronization engine, the backup synchronization engine 740, that identifies changes received at the external storage device 151. In an alternative embodiment, backup synchronization engine 740 can run on external storage device 151. When the backup synchronization engine 740 identifies changes in the backup file system 743 in backup namespace 745, it notifies the client synchronization service 156 that synchronization is necessary. For example, tree storage 220 of FIG. 2 is used to identify changes received at the backup file system 743, and what operations are needed to synchronize the files stored at the external storage device 151 and the files stored at the backup namespace 720 of FIG. 7. When a change is identified, the client synchronization service 156 can send a synchronization request to notify the content management system that synchronization is necessary.

According to some embodiments, the method includes identifying a plurality of root namespaces associated with the client synchronization service at step 820. In one example, before synchronization takes place, the client synchronization service 156 identifies all the root namespaces that are associated with the user account at the client synchronization service 156 of FIG. 7. Once the system understands which root namespaces are available to the user account and client synchronization service, the system is then able to determine which of the root namespaces experienced changes and need synchronization. For example, since there are two root namespaces in FIG. 7, account namespace 735 and backup namespace 745, the client synchronization service 156 identifies these two namespaces as associated with the user account. However, in other examples there can be additional root namespaces when additional devices are connected and communicating with the client synchronization service 156.

Identification can take place via multiple methods including checking identification information received in the synchronization request. The synchronization request can include paths, unique identifiers, or any other method for identifying root namespaces and/or devices sending the synchronization request. Further, the synchronization service can maintain a database of root namespaces and/or devices that are known to the synchronization service, thereby creating a list of root namespaces associated with the user account. In one example, when a synchronization request is received, it can contain the identifying information, that the synchronization service is able check against the database of root namespaces to determine which of the root namespaces is requesting synchronization.

According to some embodiments, the method includes selecting a backup root namespace from the plurality of root namespaces based on the backup synchronization request step 830. For example, when backup synchronization engine 740 identifies changes to backup namespace 745 in FIG. 7, backup synchronization engine 740 can provide that change data to in the request for synchronization communicated to the client synchronization service 156. Based on the request for synchronization, the client synchronization service is able to identify the backup namespace 745 as requiring synchronization and is able to confirm that changes were made at the backup namespace 745 on external storage device 151. Because the client synchronization service 156 is running synchronization processes for multiple root namespaces, each of which can be sending synchronization requests, the synchronization engine sending the request identifies which root namespace experienced the change and what device is requesting synchronization, amongst other available information regarding synchronization parameters at the backup namespace. After identifying the root namespace where synchronization is needed and the capabilities of the device, the client synchronization service 156 determines what change data should be synchronized with backup namespace 720 at content management system 110.

According to some embodiments, the method includes determining change data associated with the backup synchronization request and the backup content item in step 840. For example, the backup synchronization engine 740 has access to the tree storage 220 of FIG. 2, which allows the client synchronization service 156 to identify the changes at backup file system 740 and the operations needed to synchronize the backup namespace 745 at external storage device 151 with the backup namespace 720 at the content management system 110.

According to some embodiments, the method includes synchronizing the backup root namespace based on the change data associated with the backup synchronization request and the backup content item in step 850. In one example, once the changes are identified by the client synchronization service 156 and the backup synchronization engine 740, the client synchronization service 156 can send the identified change data and/or operations to implement the change data to the content management system 110 through server synchronization service 112. Once the change data is sent to by the content management system 110, the backup namespace 720 in the content management system 110 is synchronized with the backup namespace 745 on the external storage device 151.

Similar to process 800 in FIG. 8, where backup namespace 745 is synchronized, the synchronization process in FIG. 8 can also run for account namespace 735. For example, the account synchronization engine 730 in FIG. 7 can identify account namespace and change data associated with content items stored in account file system 733 at account namespace 735. The account synchronization engine 730 can then communicate the change data with client synchronization service 156 so that the client synchronization service 156 can identify the namespace and changes. The account synchronization engine 730, working with the client synchronization service 156, can then communicate the appropriate change data and/or operations based on the change data to the content management system 110, where the change data can be applied to account namespace 710, thereby creating a consistent synchronization state between the client device 150 and content management system 110.

The process described in FIG. 8 and the similar process running on the client device 150 for the account namespace 735, in some embodiments, are facilitated by the use of independent synchronization engines that can be run in parallel with each other. As noted with respect to FIG. 7, the client synchronization service 156 has a thread-pool 240 that allows each instance of the synchronization engine running with each namespace to share resources while operating independently. This is also further facilitated by each synchronization engine, e.g., account synchronization engine 730 and backup synchronization engine 740, having independent file systems, e.g., account file system 733 and backup file system 743 and having independent cache directories, e.g., account cache directory 738 and backup cache directory 748. By operating separate synchronization engines that have separate file systems with separate cache directories, each synchronization process can be run independently, including in parallel, to synchronize each of the multiple root namespaces. Furthermore, the synchronization engines can be designed to prevent crossing root namespace boundaries and operate solely on one root namespace. With these independent processes available, the two synchronization engines, e.g., account synchronization engine 730 and backup synchronization engine 740, can be programmed to optimize the user experience while still synchronizing changes between the user devices and the content management system. For example, multi-root synchronization engines can be operated in parallel, they can be prioritized differently depending on the parameters of the synchronization, and they can have independent schedules to avoid certain times or locations for synchronization.

Figure 9:
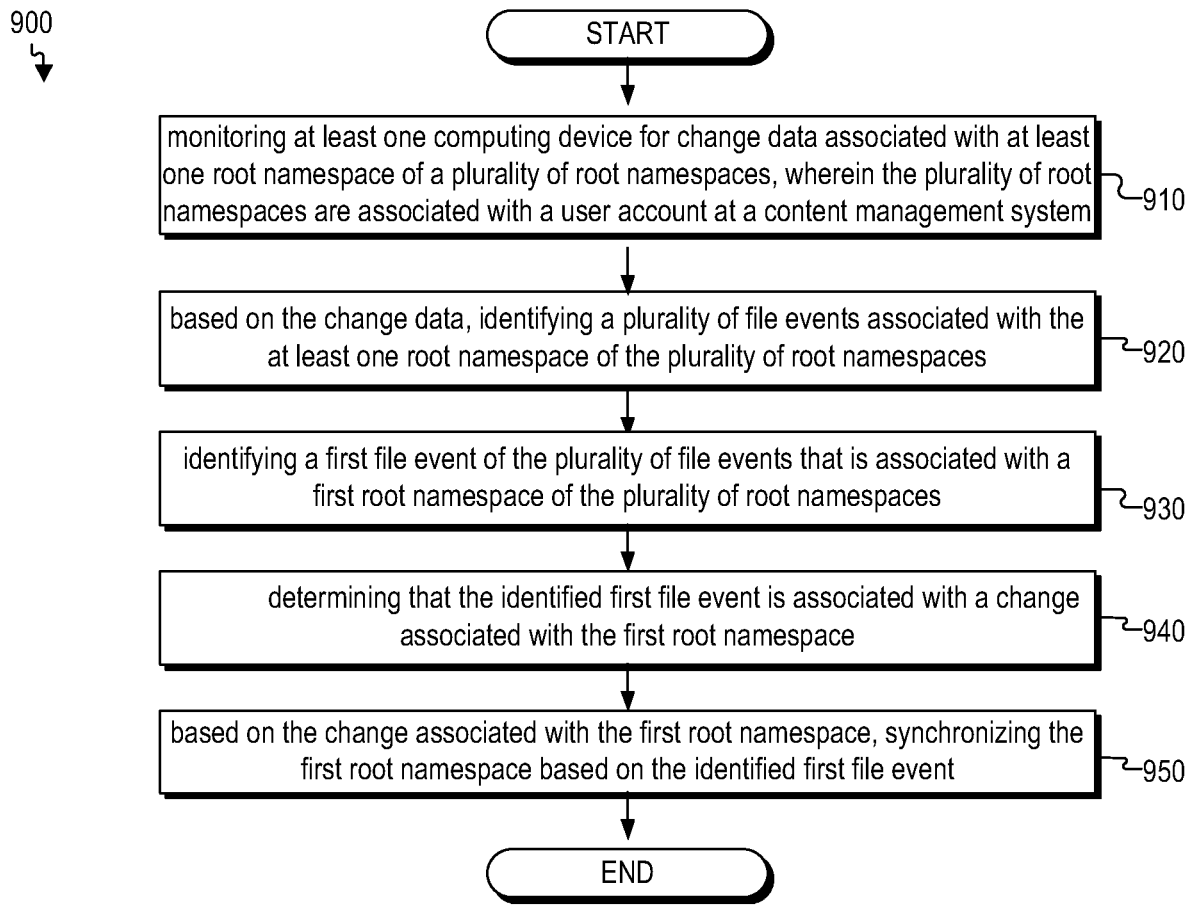
FIG. 9 illustrates an example method for identifying changes for synchronization in a multi-root synchronization system in accordance with some aspects of the present technology.

FIG. 9 illustrates an example method 900 for implementing a multi-root synchronization system that has a backup root namespace and an account root namespace. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some embodiments, the method includes monitoring at least one computing device for change data associated with at least one root namespace of a plurality of root namespaces, wherein the plurality of root namespaces are associated with a user account at a content management system at step 910. In one example, client synchronization service 156 is in communication with the account namespace 735 and backup namespace 745 of FIG. 7. The account synchronization engine 730 can detect changes associated content items stored at account namespace 735 and the backup synchronization engine 740 can detect changes associated content items stored at backup namespace 745. Further, in systems with more than two root namespaces, each of the additional namespaces will have its own independent synchronization engine that will detect changes associated with content items stored at the additional namespaces. The synchronization engines, e.g., account synchronization engine 730 and/or backup synchronization engine 740, will then communicate with the client synchronization service 156 to identify the changes at the root namespace e.g., account namespace 735 and/or backup namespace 745. The client synchronization service 156 monitors the namespaces for these communications that identify changes detected by the synchronization engines and the client synchronization service can receive or determine the change data based on the communications.

According to some embodiments, the method includes based on the change data, identifying a plurality of file events associated with the at least one root namespace of the plurality of root namespaces at step 920. For example, the client synchronization service 156 of FIG. 7 can subscribe to file events taking place on each device and each root namespace in a multi-root system associated with the user account. Accessing file events can take many forms, including communication with the operating system of the client device or interfacing with the appropriate APIs that provide access to file events at the client synchronization service. Furthermore, the synchronization engines for each namespace and the client synchronization service monitor the file events taking place at, for example, the client device 150 and the external storage device 151 of FIG. 7. Once the client synchronization service receives the file events, it can store them and associate them with a specific root namespace. In another example, the individual synchronization engine can subscribe to the file events for the files associated with its root namespace and store the file events for use in determining which files have changed. For example, backup synchronization engine 740 can subscribe to file events for the files in the backup file system 743, and only receive the file events for backup namespace 745. The backup synchronization engine 740 can then store identification for files that are changed, so that backup synchronization engine 740 can identify the changed files when synchronizing backup namespace 745.

According to some embodiments, the method includes identifying a first file event of the plurality of file events that is associated with a first root namespace of the plurality of root namespaces at step 930. As shown in FIG. 7, each of the root namespaces associated with a user account is treated as its own root namespace with an independent instance of a synchronization engine, allowing each of the root namespaces to operate independently. For example, the external storage device 151 has backup synchronization engine 740, which operates independently from account synchronization engine 730 on client device 150. Because the backup synchronization engine 740 operates independently of other synchronization engines at the client synchronization service, the backup synchronization engine 740 can listen for file events associated with the backup namespace 745 and its backup file system 743. Similarly, account synchronization engine 730 can listen for file events associated with account namespace 735 and its account file system 733. Accordingly, in this example, the backup synchronization engine 740 can subscribe to file events and listen for changes at backup namespace 745 and identify those changes and the change data needed to synchronize backup namespace 745 with content management system 110 and backup namespace 720. The backup synchronization engine 740 can then communicate those changes and/or change data along with information identifying backup namespace 745 to client synchronization service 156. This allows client synchronization service 156 to independently process the changes to backup namespace 745, and the synchronization process for backup namespace 745 remains separate and independent from any synchronization process associated with other root namespaces, e.g., account namespace 735. Using client synchronization service to synchronize changes also reduces the amount of data transmitted as the change data is synchronized instead of the entire external storage device during synchronization.

Independent operation for each instance of the synchronization engine also allows for more granular control of the synchronization operations at, for example, the backup synchronization engine 740 of FIG. 7. For example, the backup synchronization engine 740 can operate on a schedule so that the synchronization between backup namespace 745 at external storage device 151 and backup namespace 720 the content management system 110 takes place at a convenient time for the user. As one example, if a user would like to schedule backups once an hour, then the backup synchronization engine can listen for the file events, store the file events that have taken place since the last synchronization of the backup namespace, and then use the file events to only synchronize those changes when the schedule indicates that synchronization is allowed. Independent control of the synchronization process is possible because of the independent synchronization engines available for each root namespace. When there is a single synchronization engine for a single root namespace, then the updates cannot be processed separately or at different times. The inability to independently control synchronization processes leads to a poor user experience and unwanted synchronization behavior because the synchronization engine typically operates constantly, thereby utilizing resources at times the user would prefer the resources used elsewhere. In the single-root system, the resources are also not used appropriately because the synchronization engine has to check files the user doesn't want to synchronize because there is no way to separate the backup root namespace from the account root namespace in a single-root system. Further examples of independent control include the backup synchronization engine 740 operating at any pre-determined time interval that is convenient for the user. Some users may want files backed up daily, weekly, monthly, or any variation thereof. Independent processes also allow for synchronization engines and/or the client synchronization service to store the appropriate file events for periods of time until the synchronization is scheduled, and then once the synchronization processes are initiated, according to the schedule, only synchronizing the files changed between synchronization processes.

Another advantage available to independent synchronization engines is the ability to track files stored at external storage device 151, without tracking the file IDs or adding metadata to the file. Instead, when scanning the external storage device for synchronization, the client synchronization service 156 can run an algorithm or heuristic assessment of the files to determine if files, after completing operations, e.g., move, are the same as previously recognized files. Rather than relying on a file ID to determine that, for example, a moved file or renamed file, is the same before and after the move or rename, the client synchronization service is able to recognize the file independent of additional metadata added by the synchronization service.

An additional advantage of the independent synchronization engines for each namespace is that when the schedule initiates a synchronization process, the backup synchronization engine 740 in FIG. 7, for example, can look at the list of file events that occurred between scheduled synchronizations and only synchronize those changes indicated by the file events. Previously, if there was a gap in time between synchronizations, the synchronization processes would have had to scan the entire root namespace to determine if any changes had taken place. Scanning an entire root namespace is a resource-intensive process that can be avoided by assigning an independent synchronization engine to each namespace and listening for file events taking place at the root namespace. By tracking file events for each root namespace, it is possible to implement change-specific synchronization for each root namespace instead of having to scan an entire root namespace for changes, as required with single-root systems.

According to some embodiments, the method includes determining that the identified first file event is associated with a change associated with the first root namespace at step 940. For example, when the backup synchronization engine 740 of FIG. 7 identifies a file event associated with the backup namespace 745, the backup synchronization engine 740 is able to identify the change based on the file event and, based on the change, is able to determine that backup namespace 745 needs synchronization. As noted previously, the client synchronization service 156 has access to the tree storage 220 of FIG. 2, which allows the backup synchronization engine 740 to determine change data and operations needed to synchronize backup namespace 745. The client synchronization service 156 is then able to communicate the change data or the operations needed to implement the change data to the server synchronization service 112, thereby allowing the synchronization of backup namespace 745.

According to some embodiments, the method includes based on the change associated with the first root namespace, synchronizing the first root namespace based on the identified first file event at step 950. For example, after the backup synchronization engine 740 identifies the change data needed to synchronize the backup namespace 745, the client synchronization service 156, can send the change data to the server synchronization service 112 to synchronize backup namespace 745 with the content management system 110. The change data informs backup namespace 720 of the changes needed to synchronize backup namespace 720 in content management system 110.

Figure 10:
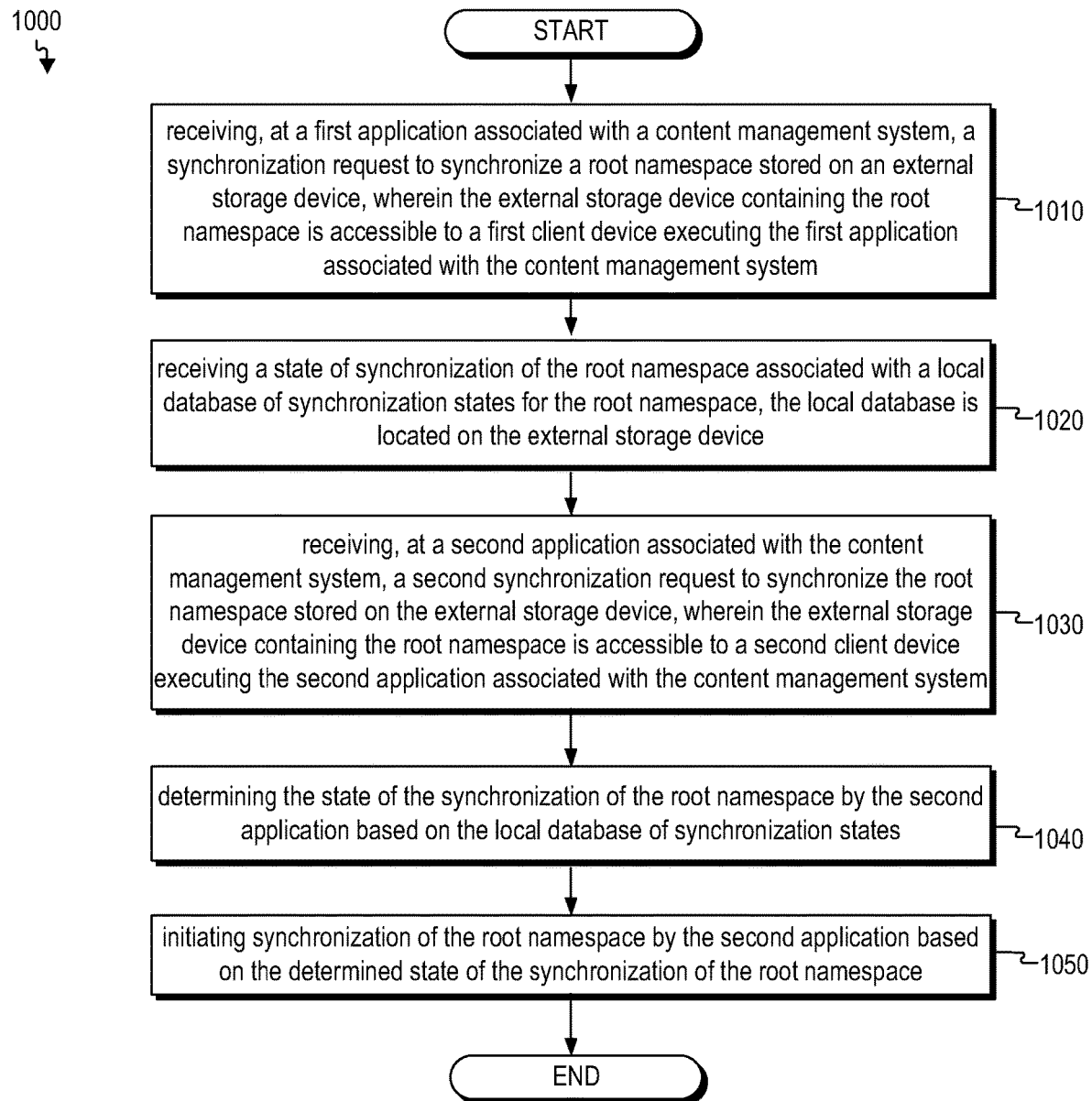
FIG. 10 illustrates an example method for synchronizing an external storage device at multiple devices in a multi-root synchronization system in accordance with some aspects of the present technology.

FIG. 10 illustrates an example method 1000 for implementing a multi-root synchronization system that allows an external drive to be backed up from multiple locations. Although the example method 1000 depicts a particular sequence of operations, the sequence may be altered without departing from the scope of the present disclosure. For example, some of the operations depicted may be performed in parallel or in a different sequence that does not materially affect the function of the method 1000. In other examples, different components of an example device or system that implements the method 1000 may perform functions at substantially the same time or in a specific sequence.

Figure 11:
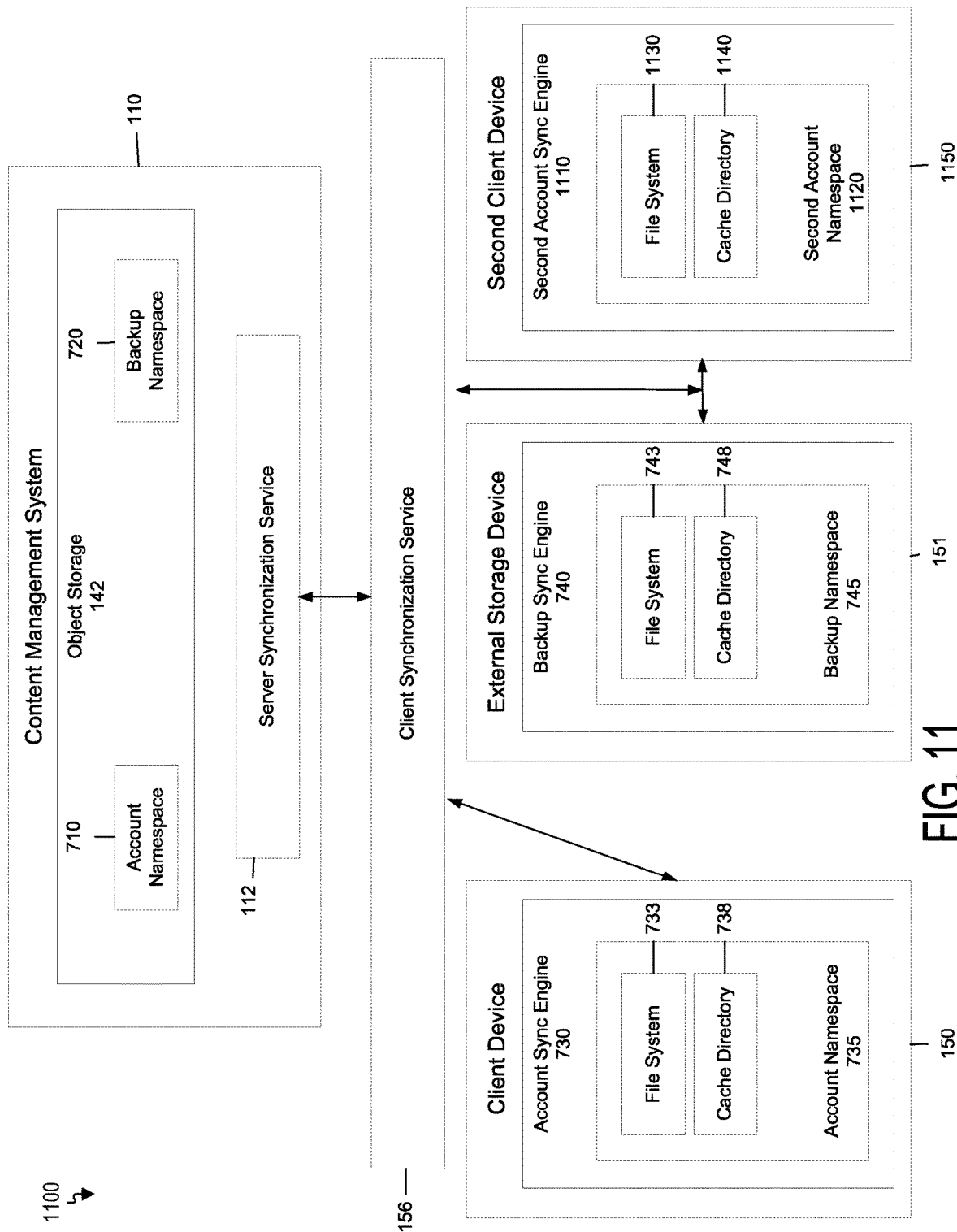
FIG. 11 illustrates an example system for synchronizing an external storage device in a multi-root synchronization system in accordance with some aspects of the present technology.

According to some embodiments, the method includes receiving, at a first application associated with a content management system, a synchronization request to synchronize a root namespace stored on an external storage device, wherein the external storage device containing the root namespace is accessible to a first client device executing the first application associated with the content management system at step 1010. For example, when the external storage device 151 of FIG. 11 is connected to or otherwise accessible by client device 150, the external storage device can communicate with the client synchronization service 156 through the backup synchronization engine 740. When the external storage device 151 is connected to client device 150, the operating system of client device 150 can detect that a new external device was connected. Once the new external device is detected, the client synchronization service can begin the synchronization process.

Furthermore, the external storage device 151 has its own backup namespace 745, which includes a backup file system 743 and a backup cache directory 748. The backup namespace 745 is accessible by the client synchronization service 156 operating at the client device 150. As discussed previously, the client synchronization service 156 can be a software program that is provided by the content management system 110 to facilitate synchronization between root namespaces accessible to client device 150 and the object storage database 142. The backup namespace 745 can use its backup synchronization engine 740 to facilitate communication through the client device 150 to provide information to the client synchronization service 156.

According to some embodiments, the method includes receiving a state of synchronization of the root namespace associated with a local database of synchronization states for the root namespace, the local database is located on the external storage device at step 1020. For example, the backup synchronization engine 740 of FIG. 11, can maintain a database that reflects the state of the synchronization of backup namespace 745 so that the backup synchronization engine 740 is able to track what events have been synchronized and what events still need to be synchronized. By providing this functionality on the backup synchronization engine 740, if there is an event affecting synchronization, e.g., a synchronization error or the external drive is disconnected, the backup synchronization engine 740 can track the synchronization state at the time of the event for the backup namespace 745. Each synchronization engine in a multi-root system can operate with its own local database of synchronization states so that each synchronization engine is able to keep a record of the state of its individual synchronization status. The database can update the client synchronization service 156 regarding the state of synchronization for the root namespace, e.g., backup namespace 745. This creates a distinct advantage over single root systems because if there is only a single synchronization engine for the client synchronization service, then the system cannot determine the synchronization status of an external drive. If an event affecting synchronization takes place in the single root system, the system is only able to determine the state of the overall synchronization of the single-root namespace, which does not contain individualized information for an external drive. Instead, if an event takes place, for example, disconnecting the external drive, the synchronization engine in a single-root namespace system would be required to reassess the external device when it is added, and start over treating the external device as new. One reason for this, the single synchronization engine continues to run after the external storage device has been disconnected. The single synchronization engine does not have the ability to track which events pertain to the client device 150 and which pertain to the external storage device 151. Because the synchronization engine continues to run, it loses the data associated with the external storage device, and when an external storage device is reconnected, the synchronization engine has to treat the external storage device as new, even if the synchronization process had previously started.

However, by running a synchronization engine on the external storage device 151, the synchronization state data is collected and stored at the external storage device 151 by the synchronization engine. When, for example, external storage device 151 is reconnected, the backup synchronization engine 740 of FIG. 7, can access the synchronization state data stored in the database, and use the synchronization state data to restart synchronization where it was interrupted. The synchronization engine can also provide the synchronization state data to the client synchronization service 156 and restart synchronization with the content management system. Without multiple namespaces, there would only be one synchronization engine for the single namespace that includes a single file system with multiple directories, and the state of the synchronization of the root namespace would include all changes and operations needed by the single root, regardless of what directory included changes. Multi-root systems solve this problem by using independent synchronization engines for each root namespace, storing the synchronization state data, and using that synchronization state data to resume synchronization when an external storage device is reconnected.

According to some embodiments, the method includes receiving, at a second application associated with the content management system, a second synchronization request to synchronize the root namespace stored on the external storage device, wherein the external storage device containing the root namespace is accessible to a second client device executing the second application associated with the content management system at step 1030. For example, in FIG. 11, the external storage device 151 can be connected with or otherwise be accessible to the second client device 1150, where the external storage device 151 can use the second client device 1150 to communicate with the client synchronization service 156, much like with external storage device 151 used the client device 150, as previously discussed. The initiation of the process at the second client device 1150 can also take place because the operating system at the second client tracks new hardware added to the system. When the external storage device 151 is connected to the second client device 1150, the operating system of the second client device notices that a new device has been connected. The client synchronization service is able to request access to the new device notification so that the application associated with the content management system can get notified when a new device is added. After receiving information that a new device has been added, the client synchronization service is able to request further information from the new device to see if the new device is known to the content management system based on the previous synchronization. In this particular example, when the external storage device 151 is connected to the second client device 1150, the client synchronization service 156 is able to analyze the data and determine that the new external storage device is known and is, in fact, the external storage device 151.

Furthermore, as shown in FIG. 11, the external storage device 151 is connected to the second client device 1150 and not directly connected to the client device 150. However, both the client device 150 and the second client device 1150 communicate with client synchronization service 156 through a software application associated with the content management system 152 of FIG. 1. Because all three devices communicate with the client synchronization service 156, if access to the external storage device 151 is interrupted, the synchronization system is able to restart synchronizing backup namespace 745 when access is reestablished, regardless of which device, e.g., client device 150, second client device 1150, or any other device running the software application associated with the content management system 152, is connected to the external storage device to reestablish access.

According to some embodiments, the method includes determining the state of the synchronization of the root namespace by the second application based on the local database of synchronization states at step 1040. For example, in FIG. 11, the client device 150 and second client device 1150 both run the synchronization processes associated with the content management system 110 and the client synchronization service 156. Because all the connected devices utilize client synchronization service 156, synchronization can resume from where it was interrupted. For example, when the external storage device 151 is reconnected to second client device 1150, which is running the software application associated with the content management system 152, the backup synchronization engine 740 is able to communicate the state of the synchronization for backup namespace 745 to client synchronization service 156. Once the backup synchronization engine 740 communicates the state of the synchronization to the client synchronization service 156, the client synchronization service 156 is able to determine the state of the synchronization of the file system for backup namespace 745. Based on this determination, the client synchronization service 156 and the backup synchronization engine 740 can resume the synchronization process from where the interruption occurred.

Once the external storage device 151 of FIG. 11 is communicating with the second client device 1150, the client synchronization service 156 can determine if the device that is connected to the second client device is a known device. Because the external storage device 151 has its own backup synchronization engine 740, which includes a database that reflects the synchronization state of the backup namespace 745, the backup synchronization engine 740 can provide the synchronization state data to the client synchronization service 156. The synchronization request provided to the client synchronization service 156 includes identification information that allows the client synchronization service 156 to determine that the backup synchronization engine 740 has been previously synchronized with the content management system 110. The identification can include, for example, a unique ID for the backup synchronization engine 740 and the state of the synchronization. This identification information and synchronization state data allows the client synchronization service 156 to recognize that backup synchronization engine 740 is known, recognize the state of the synchronization for the backup namespace 745, and resume synchronization from where it left off.

In this scenario, if a new and/or not recognized external device was added connected to second client device 1150 of FIG. 11, the client synchronization service 156 would create a new root namespace and start up a new synchronization engine for the new root namespace on the new external storage device. The new namespace would be similar to previously described root namespaces and have its own synchronization engine, file system, and cache directory. When a new device is added to the synchronization system, the client synchronization service 156 undertakes the process for adding a new device and creating a new root namespace, as previously described. Once the new drive is added, the client synchronization service 156 can request verification that a user account wants to add the new drive. If so, the client synchronization service will add the new root namespace for the newly added drive. In another example, the client synchronization service can use a root manager to listen for events at the client device 150, keep track of the root namespaces the client synchronization service 156 is responsible for, and to add the new root namespaces for newly added drives.

According to some embodiments, the method includes initiating synchronization of the root namespace by the second application based on the determined state of the synchronization of the root namespace at step 1050. The client synchronization service 156 is able to send instructions to the application associated with the content management system 152 and backup synchronization engine 740 to restart the synchronization of the root namespace where the synchronization process left off. For example, when an external storage drive is disconnected from a client device 150 while there are still files that need to be synchronized, when the external storage device 151 is connected to second client device 1150 the synchronization engine associated with the external storage device 151 will be able to restart where synchronization was interrupted. As stated previously, the synchronization engines are able to store synchronization state data to facilitate restarting synchronization from a paused or interrupted synchronization process. Using a multi-root system with independent root namespaces and synchronization engines on external devices allows the system to continue a synchronization process where it stopped. The multi-root architecture of the current system allows for the individual synchronization engines to be included with the external device, thereby increasing the flexibility for the synchronization of external devices.

FIG. 11 shows an example of a multi-root synchronization system 1100, in accordance with some embodiments and similar to the embodiment of FIG. 7, and similar numbered objects operate in similar ways. FIG. 11 shows the system after an external storage device has been disconnected from a first device and connected to a second device. Specifically in FIG. 11, the multi-root system includes a second client device 1150, similar to the client device 150 of FIG. 7. Similarly, multi-root synchronization system 1100 includes an object storage database 142, as shown in FIG. 1, a server synchronization service 112, shown in FIG. 1, and a client synchronization service 156, as shown in FIG. 2. In object storage database 142, the content management system 110 includes two namespaces associated with a user account, account namespace 710 and backup namespace 720. As previously described, each root namespace has its own file system, and each root namespace is able to be independently synchronized between the user device(s), e.g., client device 150 and second client device 1150, and the content management system 110. Server synchronization service 112 communicates with client synchronization service 156 to determine when synchronization between the content management system 110 and the client devices is required.

In some embodiments, the client synchronization service 156 communicates with client device 150, external storage device 151, and the second client device 1150. For example, under a multi-root system, each device is able to run its own instance of the synchronization engine, e.g., account synchronization engine 730 in FIG. 11, a backup synchronization engine 740 in FIG. 11, and second account synchronization engine 1110 in FIG. 11. In this example, each synchronization engine runs its own instance of the synchronization process and is able to operate independently to facilitate prioritization, different schedules, different data, and different files, amongst other differences.

In some embodiments, similar to the synchronization engines described above with respect to FIG. 7, a multi-root structure can be implemented where an instance of the synchronization engine is assigned to the second client device 1150. Under this multi-root architecture, the instance of the second account synchronization engine 1110 has its own second account namespace 1120, second account file system 1130, and second account cache directory 1140. The instance of the second account synchronization engine 1110 operates independently of the account synchronization engine 730 and backup synchronization engine 740 but is able to share resources with accessible devices through the thread-pool 240 as part of the client synchronization service 156. Furthermore, the second account namespace 1120 can be independently synchronized with account namespace 710 at the content management system 110. FIG. 11 is showing a system multiple computers connected to the same account at the content management system 110. So, when the account namespace 735 at the client device 150, second account namespace 1120 at the second client device 1150, and the account namespace 710 at content management system 110 are in a synchronized state, all three will have the same synchronized folders and files. The second account namespace 1120 can be independently monitored by the second account synchronization engine 1110, which allows second account file system 1130 and second account cache directory 1140 to have a different structure and backup process than the root namespace on external storage device 151.

Second account synchronization engine 1110 processes changes for the second account namespace 1120. The second account synchronization engine 1110 is able to identify changes needed to synchronize second account namespace 1120 with the account namespace 710 on content management system 110. Furthermore, because each synchronization engine, e.g., account synchronization engine 735 and second account synchronization engine 1110, are independent of each other, when the second account synchronization engine 1110 identifies changes in second account file system 1130, second account synchronization engine 1110 is able to transmit those changes, through client synchronization service 156, to server synchronization service 112. The content management system 110 is then able to process and apply the changes to account namespace 710.

Another benefit of the multi-root system being described is that the client device 150 or client synchronization service 156 is able to maintain a list of paths for each root namespace associated with the client synchronization service 156. For example, client device 150, second client device 1150, and/or client synchronization service 156 can include a database including a list of root namespaces that have been synchronized by client synchronization service 156 to content management system 110. This allows the system to determine if a backup drive, e.g., external storage device 151, is known to the system when it is connecting to client device 150 or second client device 1150.

The database can include paths, unique identifiers, or any other method for identifying and determining if the added device is known to the system. By identifying external devices that are known to the client synchronization service 156, the client synchronization service 156 is then able to continue operations for synchronizing a known external drive. Once recognized, the client synchronization service 156 can, for example, identify external storage device 151 and initiate synchronization with backup synchronization engine 740. It also allows the system to recognize that an external device is new, wait for the system file events on the second client device 1150 to identify the new device, and then the client synchronization service 156 can begin the process of setting up a root namespace for the new device.

Still other benefits of the multi-root system include, by having multiple root namespaces, each with its own instance of the synchronization engine, the system can customize the data being provided between the synchronization service and the second client device 1150. Similar to the system described with respect to FIG. 7, it is possible to introduce specific operations for each instance of the synchronization engine within the multi-root system. For example, when connected to second client device 1150, a user may set synchronization parameters for backup synchronization engine 740 to only synchronize backup namespace 745 in FIG. 11, overnight, when the user is not actively using second client device 1150, whereas when connected to client device 150, the user may set synchronization parameters to synchronize backup namespace 745 continuously. Using independent synchronization engines allows the system to accept scheduling for each instance of the synchronization engine. By running individual and independent synchronization engines, the system can collect more refined data, store it, and use it to provide better control of the synchronization process.

Figure 12:
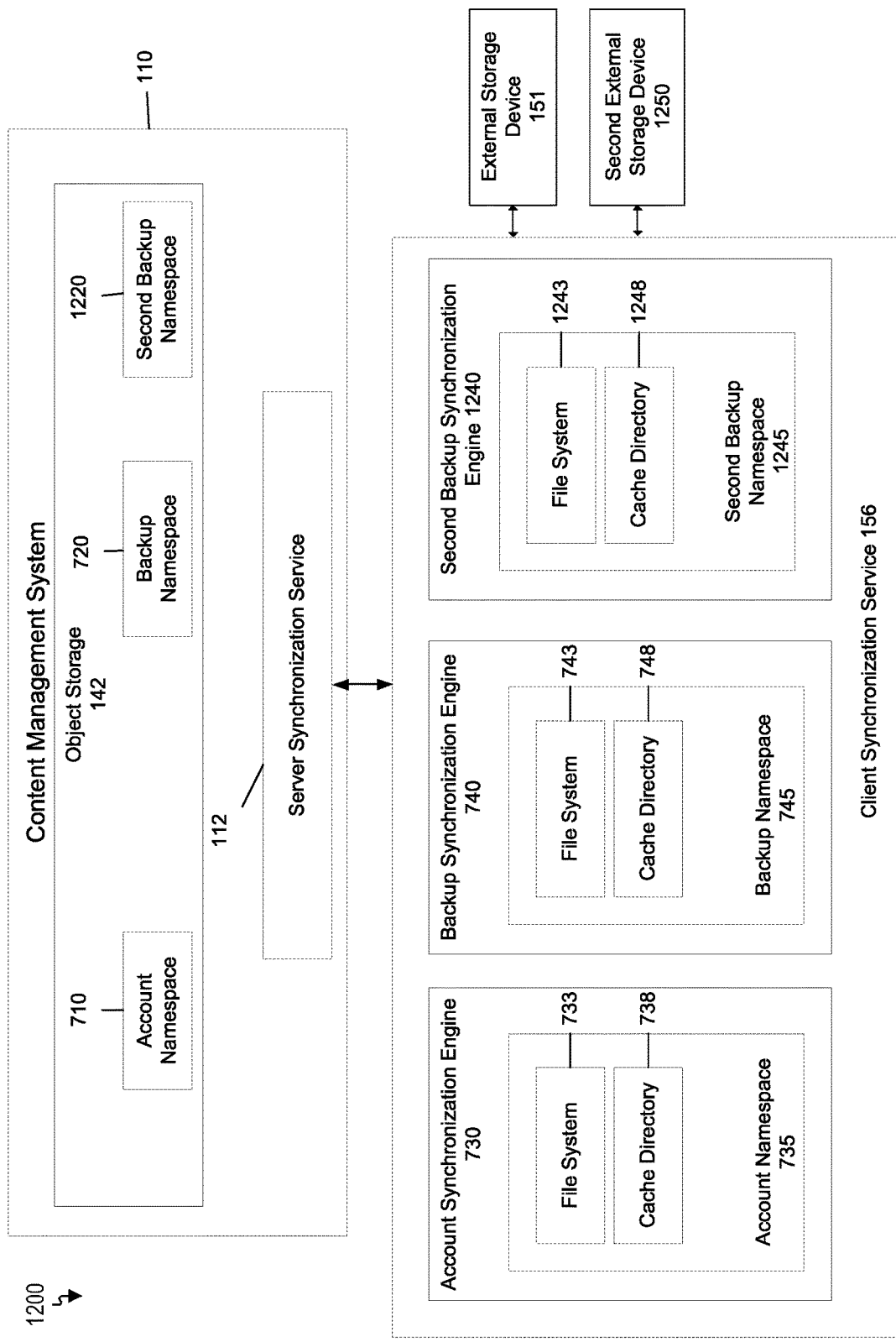
FIG. 12 illustrates an example system for synchronizing multiple external storage devices in a multi-root synchronization system in accordance with some aspects of the present technology.

FIG. 12 shows an example of a multi-root synchronization system 1200, in accordance with some embodiments, which is similar to the multi-root synchronization system 700 of FIG. 7. However, FIG. 12 includes at least one additional external storage device, second external storage device 1250. Multi-root synchronization system 1200 includes an object storage database 142 as shown in FIG. 1, a server synchronization service 112 shown in FIG. 1, and a client synchronization service 156 as shown in FIG. 2. In object storage database 142 the content management system 110 includes three namespaces associated with a user account, the account namespace 710, the backup namespace 720, and the second backup namespace 1220. Both backup namespace 720 and second backup namespace 1220 have their own root namespaces, including a file system directory and cache directory. By providing separate namespaces in a multi-root system, account namespace 710, backup namespace 720, and second backup namespace 1220 are able to be independently synchronized with an account namespace 735 on the user device, backup namespace 745 on an external storage device 151, and second backup namespace 1245, respectively. Server synchronization service 112 communicates with client synchronization service 156 to determine when synchronization between the content management system 110 and the client device 150, external storage device 151, or second external storage device 1250 is required.

In one example, the system includes multiple, independent root namespaces, the account namespace 710, backup namespace 720, and second backup namespace 1220 are included in object storage database 142. Each of the root namespaces, one associated with account namespace 710, one associated with backup namespace 720, and one associated with second backup namespace 1220 are capable of being independently synchronized and separately controlled.

In some embodiments, the client synchronization service 156 communicates with client device 150, external storage device 151, and second external storage device 1250. For example, under a multi-root system each device can run its own synchronization engine, such as an account synchronization engine 730 in FIG. 12, a backup synchronization engine 740 in FIG. 12, and second backup synchronization engine 1240. In this example, each synchronization engine runs its own synchronization process, where each synchronization engine operates independently to facilitate prioritization, different schedules, different data, and different files, amongst other differences.

In some embodiments, similar to the synchronization engines described above with respect to FIG. 7, a multi-root structure can be implemented where an instance of the synchronization engine is assigned to the second external storage device 1250. Under this multi-root architecture the instance of the second backup synchronization engine 1240 has its own second backup namespace 1245, second backup file system 1243, and second backup cache directory 1248. The instance of the second backup synchronization engine 1240 operates independently of the account synchronization engine 730 and backup synchronization engine 740 but is able to share resources through the thread-pool 240 as part of the client synchronization service 156. Furthermore, the second backup namespace 1245 can be independently synchronized with the second backup namespace 1220 at the content management system 110. Similar to the backup namespace 745, second backup namespace 1245 can be independently monitored by the second backup synchronization engine 1240, which allows second backup namespace 1245 to have a different structure and backup process than the other root namespaces associated with a user account.

Another further example consistent with the present disclosure is each root namespace using an independent instance of a synchronization engine, which allows each root namespace of the multi-root system to independently synchronize the file system. For example, because the second backup synchronization engine 1240 processes changes for the second backup namespace 1245, the second backup synchronization engine 1240 can identify changes at second backup namespace 1245 and communicate the changes and/or the operations necessary to implement the changes, to second backup namespace 1220 on content management system 110. Furthermore, because each of the root namespaces, e.g., account namespace 735, backup namespace 745, and second backup namespace 1245, is independent of each other, when the second backup synchronization engine 1240 identifies changes in the second backup namespace 1245, second backup synchronization engine 1240 is able to transmit those changes, through client synchronization service 156, to server synchronization service 112, without reference to any changes at other root namespaces. The content management system 110 can process and apply the changes to second backup namespace 1220, regardless of if there are any changes on any other root namespace, e.g., account namespace 710 or backup namespace 720. By using independent instances of the synchronization engine for each root namespace, the system is able to independently identify, communicate, and implement changes at the root namespace without impacting any other root in the system.

Still other benefits of the multi-root system include, that by having multiple root namespaces, each with its own instance of the synchronization engine, the system can, for example, customize the data being provided between the synchronization service and the second external storage device 1250. Similar to the system described with respect to FIG. 7, it is possible to introduce specific operations for each instance of the synchronization engine within the multi-root system. For example, a user may set synchronization parameters for second backup synchronization engine 1240 to synchronize second backup namespace 1245 in FIG. 12 hourly, while also setting synchronization parameters for backup namespace 745 to run the synchronization process overnight, when the user is not actively using the system.

Using independent synchronization engines allows the system to accept scheduling for each instance of the of the synchronization engine. By running individual and independent synchronization engines, the system can collect more refined data, store it, and use it to provide better control of the synchronization process.

In an alternative embodiment, similar to the embodiment described with respect to FIG. 11, the root namespaces can be stored on each individual device. For example, in FIG. 12, client device 150 can store the account namespace, external storage device 151 can store the backup namespace 745, and second external storage device 1250 can store second backup namespace 1245. By storing the root namespaces on each device, it is possible to move the external storage devices between client devices, without losing any synchronization data or synchronization progress. Each device would operate the root namespace and its respective synchronization engine in the same manner as described above.

Figure 13:
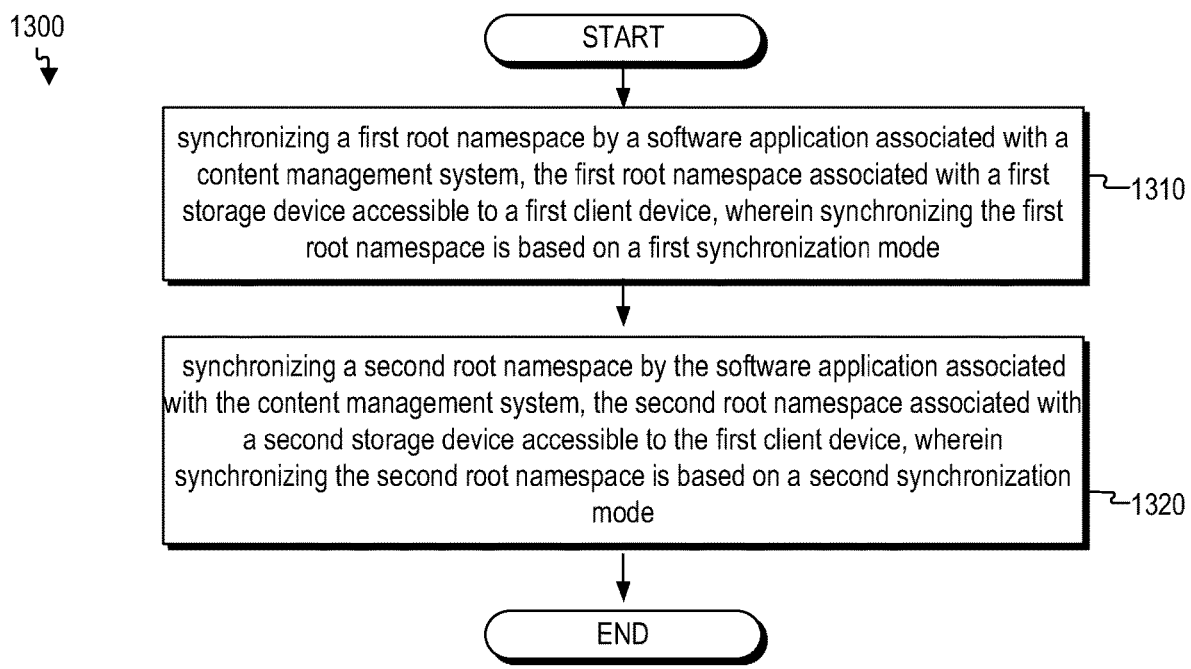
FIG. 13 illustrates a method for synchronizing content items in a multi-root synchronization system based on multiple independent parameters in accordance with some aspects of the present technology.

FIG. 13 illustrates an example method 1300 for implementing a synchronization system that allows for multiple synchronization modes based on the device and parameters governing that device. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

According to some embodiments, the method includes synchronizing a first root namespace by a software application associated with a content management system, the first root namespace stored on a first storage device accessible to a first client device, wherein the synchronizing the first root namespace is based on a first synchronization parameters at step 1310. For example, in FIG. 12, the external storage device 151 has its own root namespace, e.g., backup namespace 745. Backup namespace 745 has its own file system, which can be synchronized according to parameters that are available to backup namespace 745. Furthermore, because the parameters are independent and are not reliant on a different root namespace, the parameters of backup namespace 745 are not impacted by any other synchronization parameters for different root namespaces within the multi-root synchronization system.

According to some embodiments, the method includes synchronizing a second root namespace by the software application associated with the content management system, the second root namespace stored on a second storage device accessible to the first client device, wherein synchronizing the second root namespace is based on second synchronization parameters at step 1320. For example, in FIG. 12, second external storage device 1250 has its own root namespace, e.g., second backup namespace 1245, with a second backup file system 1243. Because the second backup namespace 1245 has its own synchronization engine, second backup file system 1243 can be synchronized according to parameters that are available to second backup namespace 1245. Furthermore, because the parameters are for the second backup namespace 1245 and are not reliant on the any other root namespace, e.g., backup namespace 745, the parameters for second backup namespace 1245 are independent of any other synchronization parameters within the multi-root system.

The synchronization parameters for the above-described process can take many forms depending on the type of external drive used, the location of its use, the manner of its use, and the permissions assigned to the user account by the content management system. For example, the mode of synchronization, e.g., one-way, two-way, one-way delete, server mirror, etc., can be altered depending on the synchronization parameters. Further synchronization parameters can include algorithms used for synchronization, e.g., data synchronized, resources dedicated to synchronization, permissions, prioritization, schedule, etc. Furthermore, the client device 150 can be any device capable of storing content items and running the software application associated with the content management system 152. For example, the client device 150 of FIG. 12 can be a laptop computer, desktop computer, external storage drive, local or remote server, mobile device, tablet, etc. Similarly, the second client device can be, for example, second external storage device 1250 of FIG. 12 or any device capable of storing content items and communicating with the first client device.

One method of implementation for the above process is to use individual synchronization engines for each root namespace. For example, as shown in FIG. 12, the external storage device 151 has a backup synchronization engine 740 and the second external storage device 1250 has a second backup synchronization engine 1240. Each of backup synchronization engine 740 and second backup synchronization engine 1240 can operate with respect to its individual root namespace, e.g., backup namespace 745 and second backup namespace 1245, respectively, and the operations can be customized based on the parameters for each root namespace.

For example, the system can include synchronization parameters implementing a schedule for each root namespace. This can take many forms and can include scheduled times, scheduled locations, and accessible devices, amongst others. In FIG. 12, the backup synchronization engine 740 can be scheduled to operate only at night, so that the computer resources are not impacted during the usual working day by a backup process running. The schedule can also include multiple variables, which can provide additional parameters to the schedule. One example of an additional variable is the power source of the client device connected to the external storage device 151. If the client device 150 is a laptop, then the backup synchronization engine 740 can poll the client device for its power source. When the client device 150 is being powered by AC power, for example when it is plugged into a wall outlet, the client device can provide that information to the backup synchronization engine 740. Based on this power source information, the backup synchronization engine 740 can initiate a synchronization process during the scheduled time. However, if the power source information from the client device 150 indicates that the client device 150 is operating on battery power, then when the schedule indicates that a synchronization process is supposed to start, the backup synchronization engine 745 can delay the synchronization until the power source indicates a change to AC power. This allows the user of client device 150 and external storage device 151 to control when and how to optimize synchronization for the user's specific use case. An individualized process is not possible in a single root system with only a single synchronization engine for the entire client synchronization process. In a single-root system the synchronization process would have to either run or pause, but cannot run on the client device 150 while pausing on the second external storage device 1250. Operating multiple root namespaces allows for further synchronization customization based on parameters for the system.

The parameters can also include modes of synchronization. For example, synchronization modes can be reflective of user choices or hardware limitations. When an external storage device only supports one-way synchronization, then the system can implement one-way synchronization for that root namespace. One benefit of the current disclosure is that the system can synchronize external storage devices that support one-way communications. Previously, read-only external storage devices caused synchronization problems because it was not possible to store the synchronization information with the drive. However, with the current multi-root architecture, the system is able to store a synchronization engine on the hard drive of the local device that is used for synchronization purposes. For example, if external storage device 151 of FIG. 12, is a read-only storage device, the backup namespace 745, backup synchronization engine 740, backup file system 743, and backup cache directory 748 can be stored on the client device 150, separately and independently from account namespace 735. Storing the backup synchronization engine 740 on the client device 150 allows the client synchronization service 156 to have access to the synchronization data associated with the external storage device 151 without storing the data on the read-only device. Storing a separate and independent synchronization engine on client device 150, allows the client synchronization service 156 to identify external storage device 151 as a known device, even though the hardware only supports read-only access, because the appropriate data is stored on client device 150, which interacts with client synchronization service 156. Client synchronization service 156 can then identify and synchronize the second backup namespace 1250.

Furthermore, when the external storage device includes the capability to perform two-way synchronization then two-way synchronization can also be supported by client synchronization service 156. It is also possible to implement a mode where the files, once uploaded to content management system 110, are deleted from the external storage device 151. This mode of operation allows the external storage device 151 to backup files at backup namespace 720 and then conserve storage at external storage device 151 by deleting the synchronized files. In a further example, an external storage device 151 can be set up to mirror the backup namespace 720 at the content management system 110. When the server mirror mode is utilized, the changes that take place at backup namespace 720 at the content management system 110 are synchronized with backup namespace 745, so that a copy of the backup namespace 720 is created. However, in this server mirror mode, changes are not made and/or accepted at the backup namespace 745, instead only changes from the content management system are implemented.

It is also possible to support a synchronization mode that synchronizes changes and then deletes the modifications. For example, the system can receive modifications at backup namespace 720 that the system can recognize those changes as sensitive and that the user does not want to store those changes at backup namespace 720. In this case, the content management system can synchronize the modifications received at backup namespace 720 with backup namespace 745, and then delete the changes from the backup namespace 720, thereby backing up the modifications but not permanently storing them at the content management system. Similarly, this synchronization mode can work in reverse. If the external storage device 151 is a mobile phone, it is possible to synchronize files or file types with backup namespace 720, and once synchronized, delete those files or file types from the mobile phone to conserve storage space. Accordingly, the synchronization process can be configured to operate in a mode that is best suited for a particular use case. A user can, for example, designate a type of file, file folder, or specific subset of files for storage in only a single location, e.g., only at the external storage device or only at the content management system, and delete modifications received outside of the specified location. As can be seen, the mode of synchronization is capable of granular control to improve the user's experience with synchronization processes.

The parameters can also include different synchronization algorithms that can be optimized for each external storage device and client device. For example, the synchronization engine can customize its synchronization algorithm when there is support for extended attributes on the drive. If extended attributes are supported, then the synchronization algorithm can include extended attributes as well. However, when the file system does not support extended attributes, then the synchronization algorithm can be customized to avoid synchronizing extended attribute data. In another example, the synchronization engines can customize synchronization algorithms so that certain operations are not synchronized to the content management system 110 of FIG. 12. For example, if there is an inadvertent deletion of numerous files that is unexpected, e.g., entire folders or directories at backup namespace 745 in FIG. 7, then the algorithm can recognize that the mass deletion is a new and/or rare operation at the backup namespace 745, and prevent synchronization of the mass delete operation up to the content management system 110. Blocking a new and/or rare operation at root namespaces would allow the user to recover all the accidentally deleted files from the content management system 110 after an inadvertent mass deletion. As previously mentioned, there are many different types of external storage devices, with different capabilities, using a multi-root architecture, allows each external storage device to use algorithms that optimize performance of that external storage device.

The synchronization parameters can also be related to accessibility of the external storage device 151 or second external storage device 1250. For example, the synchronization parameters can receive an indication of the network bandwidth available to the client synchronization service 156. When the network bandwidth is lower than an amount of bandwidth permitted to be utilized by the client synchronization service 156, the service can limit or pause synchronization to wait for bandwidth to improve. Further, if the network bandwidth is intermittent, then the system can pause synchronization to maximize bandwidth for other more critical functions and wait for the network bandwidth to improve. It is also possible for the synchronization algorithm to alter the synchronization mode. For example, a user may wish to only use one-way synchronization when the bandwidth available is detected as low or intermittent. Altering the synchronization mode with the synchronization algorithm would also allow, for example, second external storage device to synchronize file system 1243 with second backup namespace 1220, without needing to synchronize second backup namespace 1220 with file system 1243, thereby reducing bandwidth usage when it is the quality of service is low. Similarly, the system can prioritize backups that are of particular importance or assigned a high priority by a user or the system and dedicate a larger share of the network bandwidth to higher priority synchronizations. For example, a user can designate a specific file for immediate download from the content management system 110, and the synchronization algorithm can optimize the synchronization to reflect this priority. A similar example is that types of files or files in specific folders can be designated for priority synchronization, so that whenever files of the type or in the specific folder are added or modified, the algorithm can recognize the change and optimize the synchronization based on the priority assigned to those file types or file locations. Operating separate root namespaces, each with its own synchronization engine, allows for the optimization of synchronization based on the parameters available to client synchronization service 156, client device 150, external storage device 151, and second external storage device 1250 during synchronization.

The parameters for synchronization can include permissions associated with the user account at the content management system. For example, if an enterprise sets up a synchronization system like that in FIG. 12, and the external storage device 151 is in the user's office while the second external storage device 1250 is at the user's home, then the system could be organized such that when the client device 150 is connected to the external storage device 151 in the office, then the system will support two-way synchronization between the external storage device 151 and the backup namespace 720 and between the client device 150 and account namespace 710. However, when the client device 150 is connected to the second external storage device 1250 at the user's home, the system will only support one-way synchronization between client device 150 and account namespace 710, while at the same time, the system will support full two-way synchronization for the second external storage device 1250 and the second backup namespace 1220. In this example, the synchronization process can accept permissions that allow for files to be located at a user's home, but changes will not be synchronized back to the content management system 110 until the client device 150 is in a secure environment.

One consequence of having permission based synchronization processes, is that a user may try to synchronize a root namespace that is not permitted. When a synchronization process is not permitted, the synchronization request can be recognized by client synchronization service 156 or server synchronization service 112, as outside of the permissions assigned to the root namespace and reject the synchronization request. In one example, if backup synchronization engine 740 sends the rejected synchronization request, the backup synchronization engine 740 can subsequently query the server synchronization service 112 to request what policy parameters led to the rejection. The backup synchronization engine 740 can then attempt to remediate the issues that led to the rejection. In one example, the client synchronization system can alert the user that the synchronization process is not allowed because of an insecure location or an insecure connection with the content management system 110. To run the synchronization process, the user can retry synchronization at a secure location and/or use a secure connection. Specifically, in this example, if the user is in the office at work and makes changes to files in the backup namespace 745, the client synchronization system can communicate with the backup synchronization engine 740 to recognize the change data and synchronize the change data with backup namespace 720 at object storage database 142. However, if the server synchronization service recognizes that the user took the client device 150 and external storage device 151 to their home to continue working, the server synchronization service 112 can recognize the change in location, and reject any synchronization requests received at backup namespace 720 at object storage database 142. A similar process can be undertaken based on file types, geographic restrictions, connection based restrictions (e.g., wireless vs wired), or any other permission based synchronization process. Using a permission based synchronization process allows an enterprise or user to set permissions at the server to allow or reject synchronization requests depending on the synchronization parameters at the client synchronization service and the server synchronization service.

Figure 14:
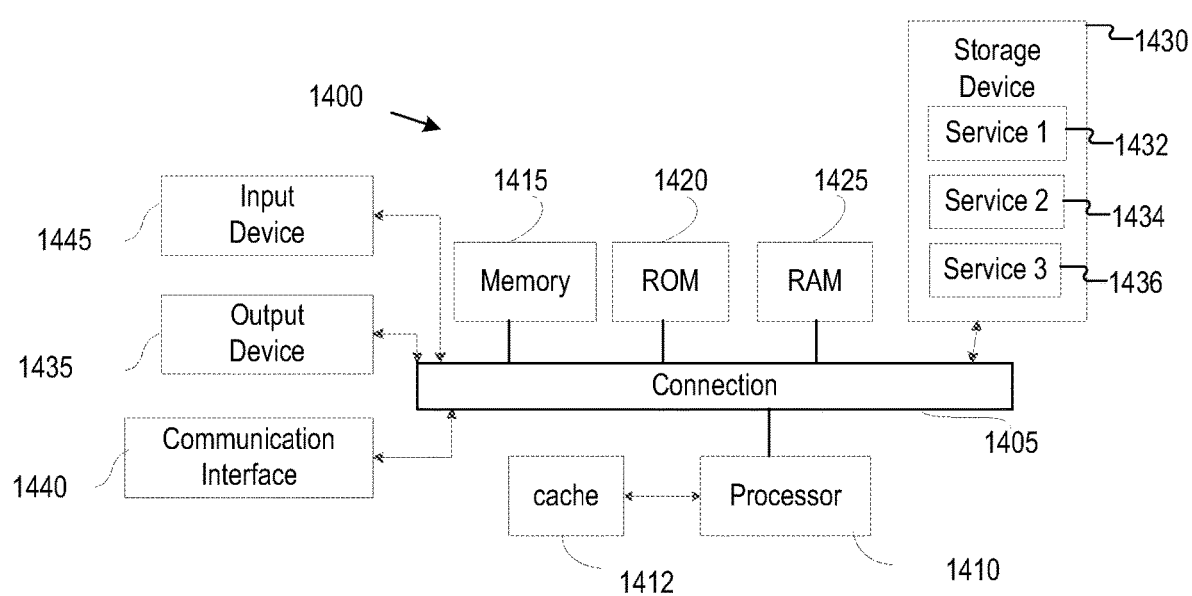
FIG. 14 shows an example of a system for implementing certain aspects of the present technology.

FIG. 14 shows an example of computing system 1400, which can be for example any computing device making up content management system 110, client device 150, external storage device 151, or any component thereof in which the components of the system are in communication with each other using connection 1405. Connection 1405 can be a physical connection via a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Exemplary computing system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache of high-speed memory 1412 connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms known to those of skill in the art. In some instances, multimodal systems can enable a user to provide multiple types of input/output to communicate with computing system 1400. Computing system 1400 can include communications interface 1440, which can generally govern and manage the user input and system output. There is no restriction on operating on any particular hardware arrangement, and therefore the basic features here may easily be substituted for improved hardware or firmware arrangements as they are developed.

Storage device 1430 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices. The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
receiving, at a client synchronization service associated with a content management system, a backup synchronization request associated with a backup content item stored at an external storage device;
identifying a plurality of root namespaces associated with the client synchronization service, wherein each of the plurality of root namespaces has a synchronization engine;
selecting a backup root namespace from the plurality of root namespaces based on the backup synchronization request, wherein the backup root namespace is associated with a backup synchronization engine configured to run on the external storage device and independently synchronize the backup root namespace;
determining change data associated with the backup synchronization request and the backup content item; and
synchronizing, by the backup synchronization engine, the backup root namespace based on the change data associated with the backup synchronization request and the backup content item.

2. The method of claim 1, further comprising:
receiving, at the client synchronization service associated with the content management system, a second synchronization request;
selecting a second root namespace of the plurality of root namespaces based on the second synchronization request;
determining second change data associated with the second synchronization request; and
synchronizing the second root namespace based on the second change data associated with the second synchronization request.

3. The method of claim 2, wherein the second root namespace synchronizes the second change data using a second synchronization engine and the backup root namespace synchronizes using the first synchronization engine and the second synchronization engine is independent of the first synchronization engine.

4. The method of claim 3, wherein the second root namespace is an account root namespace that synchronizes a file system directory using the second synchronization engine on a client device, wherein the client device is different than the first device.

5. The method of claim 2, wherein the backup root namespace includes a first file system directory and the second root namespace includes a second file system directory, and the first file system directory is independent of the second file system directory.

6. The method of claim 5, further comprising:
detecting an allow file in the first file system directory;
interpreting a rule within the allow file to identify at least one content item stored in association with the first file system directory for synchronization; and
synchronizing the at least one content item.

7. The method of claim 1, wherein the backup synchronization request is based on a synchronization schedule for the backup root namespace.

8. The method of claim 7, the method further comprising:
detecting a change from a source external to the client synchronization service, wherein the change includes:
a power source available to the client synchronization service, a power source available to the first device, a network condition available to the client synchronization service, a location, or a priority associated with the backup root namespace; and
triggering the synchronization schedule based on the change being detected.

9. A system for using a bidirectional synchronization service of a content management system to provide an object backup service, comprising:
at least one non-transitory computer-readable medium including instructions stored thereon; and
at least one processor configured to execute the instructions that cause the at least one processor to:
receive, at a client synchronization service, a backup synchronization request associated with a first root namespace;
identify, by the client synchronization service, a first synchronization engine from a plurality of synchronization engines, wherein the first synchronization engine is associated with the first root namespace and is configured to run on a first device and independently synchronize the first root namespace;
determine, by the first synchronization engine, change data associated with the first root namespace; and
synchronize, by the client synchronization service, the first root namespace using the first synchronization engine, based on the change data associated with the backup synchronization request and the first root namespace.

10. The system of claim 9 wherein the instructions cause the at least one processor to:
receive, at the client synchronization service, a second synchronization request from associated with a second root namespace;
identify, by the client synchronization service, a second synchronization engine from the plurality of synchronization engines, wherein the second synchronization engine is associated with the second root namespace;
determine, by the second synchronization engine, second change data associated with the second synchronization request; and
synchronize, by the client synchronization service, the second root namespace using the second synchronization engine, based on the second change data associated with the second synchronization request and the second root namespace.

11. The system of claim 10, wherein the first synchronization engine is independent of the second synchronization engine.

12. The system of claim 10, wherein the first root namespace includes a first file system directory and the second root namespace includes a second file system directory, and the first file system directory is independent of the second file system directory.

13. The system of claim 12, wherein the instructions cause the at least one processor to:
detect an allow file in the first file system directory;
interpret a rule within the allow file to identify at least one content item stored in association with the first file system directory for synchronization; and
synchronize the at least one content item.

14. The system of claim 10, wherein the first synchronization engine is stored on an external backup device and the second synchronization engine is stored on a first client device.

15. The system of claim 10, wherein the instructions cause the at least one processor to:
configure a synchronization schedule for the first synchronization engine, wherein the synchronization schedule is based on parameters external to the client synchronization service.

16. A non-transitory computer-readable medium including instructions stored thereon, the instructions, when executed by a computing system, being effective to cause the computing system to:
receive, at a user account associated with a content management system, a backup synchronization request associated with a root namespace accessible by the user account at a first external client device;
identify a plurality of namespaces associated with the user account;
selecting a first root namespace from the plurality of namespaces based on the backup synchronization request, wherein each of the plurality of root namespaces has a synchronization engine, wherein the first root namespace has a first synchronization engine configured to run on the first external device and independently synchronize the backup root namespace;
determine change data associated with the backup synchronization request and the first root namespace; and
synchronize, by a first synchronization engine associated with the first root namespace, the first root namespace, based on the change data associated with the backup synchronization request and the first root namespace.

17. The non-transitory computer-readable medium of claim 16 wherein the instructions, when executed by the computing system, being further effective to cause the computing system to:
receive, at the user account associated with the content management system, a second synchronization request;
select a second root namespace from the plurality of namespaces based on the second synchronization request;
determine, by a second synchronization engine, second change data associated with the second synchronization request and the second root namespace; and
synchronize the second root namespace based on the second change data associated with the second synchronization request and the second root namespace.

18. The non-transitory computer-readable medium of claim 17,
wherein the second root namespace synchronizes the second change data with the second synchronization engine and the first synchronization engine is independent of the second synchronization engine.

19. The non-transitory computer-readable medium of claim 18 wherein the instructions, when executed by the computing system, being further effective to cause the computing system to:
configure a first synchronization schedule for the first synchronization engine and a second synchronization schedule for the second synchronization engine, wherein the first synchronization schedule is based on resources available to a synchronization service and the second synchronization schedule is based on parameters received by the second synchronization engine.

* * * * *

UNITED STATES PATENT AND TRADEMARK OFFICE
CERTIFICATE OF CORRECTION

PATENT NO. : 12,306,800 B2
APPLICATION NO. : 18/087721
DATED : May 20, 2025
INVENTOR(S) : Sourabh Yerfule et al.

Page 1 of 1

It is certified that error appears in the above-identified patent and that said Letters Patent is hereby corrected as shown below:

In the Claims

In Claim 10, Column 54, Lines 35:
"synchronization request from associated with a second"
Should be corrected as follows:
"synchronization request associated with a second"

Signed and Sealed this
First Day of July, 2025

Coke Morgan Stewart
*Acting Director of the United States Patent and Trademark Office*